(12) United States Patent
Smith et al.

(10) Patent No.: US 8,071,528 B2
(45) Date of Patent: Dec. 6, 2011

(54) CLEANING COMPOSITIONS WITH WATER INSOLUBLE CONVERSION AGENTS AND METHODS OF MAKING AND USING THEM

(75) Inventors: Kim R. Smith, Woodbury, MN (US); Keith E. Olson, Apple Valley, MN (US); Kristen A. Mills, Hopkins, MN (US); Lee J. Monsrud, Inver Grove Heights, MN (US); Michael Rischmiller, Faribault, MN (US)

(73) Assignee: Ecolab USA Inc., St. Paul, MN (US)

( * ) Notice: Subject to any disclaimer, the term of this patent is extended or adjusted under 35 U.S.C. 154(b) by 201 days.

(21) Appl. No.: 12/114,486

(22) Filed: May 2, 2008

(65) Prior Publication Data
US 2008/0280800 A1    Nov. 13, 2008

Related U.S. Application Data

(60) Provisional application No. 60/927,575, filed on May 4, 2007.

(51) Int. Cl.
| C11D 17/00 | (2006.01) |
| C11D 17/06 | (2006.01) |
| C11D 3/10  | (2006.01) |
| C11D 3/12  | (2006.01) |
| C11D 7/02  | (2006.01) |
| C11D 7/12  | (2006.01) |
| B08B 7/00  | (2006.01) |
| B08B 9/20  | (2006.01) |
| D06L 1/12  | (2006.01) |

(52) U.S. Cl. ........ 510/445; 510/446; 510/451; 510/108; 510/220; 510/224; 510/234; 510/283; 510/298; 510/509; 510/514; 510/521; 134/25.2; 134/25.4; 134/42; 8/137

(58) Field of Classification Search .................. 510/445, 510/446, 444, 451, 108, 220, 224, 234, 298, 510/509, 514, 521, 283; 134/25.2, 25.4, 134/42; 8/137
See application file for complete search history.

(56) References Cited

U.S. PATENT DOCUMENTS

| 1,638,803 | A |   | 8/1927  | Gibson et al. |
| 3,931,031 | A |   | 1/1976  | Willard, Sr. |
| 3,932,224 | A |   | 1/1976  | Hirota et al. |
| 4,036,749 | A |   | 7/1977  | Anderson |
| 4,038,430 | A |   | 7/1977  | Drake et al. |
| 4,150,001 | A |   | 4/1979  | Sen |
| 4,174,291 | A | * | 11/1979 | Benjamin et al. ............. 510/348 |
| 4,389,323 | A |   | 6/1983  | Gancy |
| 4,395,344 | A | * | 7/1983  | Maddox ........................ 510/196 |
| 4,435,307 | A |   | 3/1984  | Barbesgaard et al. |
| 4,443,270 | A |   | 4/1984  | Biard et al. |
| 4,678,685 | A |   | 7/1987  | Hasson et al. |
| 4,713,159 | A |   | 12/1987 | Truitt et al. |
| 4,820,439 | A |   | 4/1989  | Rieck |
| 4,844,828 | A |   | 7/1989  | Aoki |
| 4,908,148 | A |   | 3/1990  | Caravajal et al. |
| 4,917,812 | A |   | 4/1990  | Cilley |
| 4,966,606 | A |   | 10/1990 | Garner-Gray et al. |
| 5,152,904 | A |   | 10/1992 | Kedem et al. |
| 5,182,028 | A |   | 1/1993  | Boffardi et al. |
| 5,277,823 | A |   | 1/1994  | Hann et al. |
| 5,308,403 | A |   | 5/1994  | Yam et al. |
| 5,364,551 | A |   | 11/1994 | Lentsch et al. |
| 5,370,867 | A | * | 12/1994 | Okawa et al. .............. 424/78.02 |
| 5,376,310 | A |   | 12/1994 | Cripe et al. |
| 5,407,471 | A |   | 4/1995  | Rohr et al. |
| 5,431,836 | A |   | 7/1995  | Carr et al. |
| 5,540,866 | A |   | 7/1996  | Aszman et al. |
| 5,614,027 | A | * | 3/1997  | Dunn et al. ........................ 134/2 |
| 5,624,892 | A |   | 4/1997  | Angevaare et al. |
| 5,658,867 | A |   | 8/1997  | Pancheri et al. |
| 5,698,506 | A |   | 12/1997 | Angevaare et al. |
| 5,733,865 | A |   | 3/1998  | Pancheri et al. |
| 5,750,086 | A |   | 5/1998  | You |
| 5,763,376 | A | * | 6/1998  | Ward et al. .................... 510/191 |
| 5,783,539 | A |   | 7/1998  | Angevaare et al. |
| 5,863,877 | A |   | 1/1999  | Carr et al. |
| 5,874,397 | A |   | 2/1999  | Schimmel et al. |
| 5,879,562 | A |   | 3/1999  | Garbutt |
| 5,914,305 | A | * | 6/1999  | Madison et al. .............. 510/367 |

(Continued)

FOREIGN PATENT DOCUMENTS

EP    0008211 B1    12/1981

(Continued)

OTHER PUBLICATIONS

Author Unknown, "Introducing Revolutionary Nano-Crystal Technology for Eliminating Scale," ScaleX2-Revolutionary Scale Prevention Technology, OptiPure, http://www.optipurewater.com/Downloads/Other_downloads/SX2Techbro.pdf.

Berner, R.A., "The Role of Magnesium in the Crystal Growth of Calcite and Aragonite from Sea Water," Geochimica et Cosmochimica Acta, vol. 39, Issue 4, Apr. 1975, pp. 489-494.

Bischoff, J.L. and Fyfe, W.S., "Catalysis, Inhibition, and the Calcite-Aragonite Problem," American Journal of Science, vol. 266, Feb. 1968, pp. 65-79.

Ceramic Filters Company, Technical water filtration information on the AquaCera water filter, 3 pages.

Coetzee et al., "Scale reduction and scale modification effects induced by Zn and other metal species in physical water treatment", Water SA, vol. 24 No. 1 Jan. 1998, 77-84, ISSN: 0378-4738.

Cölfen et al., "A Systematic Examination of the Morphogenesis of Calcium Carbonate in the Presence of a Double-Hydrophilic Block Copolymer", Chem. Eur. J. 2001, 7, No. 1, 106-116, 11 pages.

(Continued)

*Primary Examiner* — Lorna M Douyon
(74) *Attorney, Agent, or Firm* — Andrew D. Sorensen; Laura C. Dilorenzo; Amy J. Hoffman

(57) ABSTRACT

The present invention relates to cleaning compositions comprising conversion agents and methods of using them. The conversion agents of the present invention comprise water insoluble compounds such as metal oxides, metal hydroxides, and combinations thereof. The compositions can be substantially free of a builder, e.g., a chelating agent, sequestrant, and/or threshold agent, while still achieving effective soil removal.

18 Claims, 3 Drawing Sheets

U.S. PATENT DOCUMENTS

| | | | |
|---|---|---|---|
| 5,968,892 A * | 10/1999 | Hutchins | 510/447 |
| 5,993,737 A | 11/1999 | Mackintosh et al. | |
| 6,083,894 A | 7/2000 | Keyes et al. | |
| 6,121,213 A * | 9/2000 | Vergara et al. | 510/116 |
| 6,218,351 B1 * | 4/2001 | Busch et al. | 510/311 |
| 6,221,146 B1 | 4/2001 | Fortier et al. | |
| 6,299,701 B1 | 10/2001 | Aubay et al. | |
| 6,365,101 B1 | 4/2002 | Nguyen et al. | |
| 6,402,824 B1 | 6/2002 | Freeman et al. | |
| 6,448,210 B1 | 9/2002 | Keyes et al. | |
| 6,610,645 B2 | 8/2003 | Pancheri et al. | |
| 6,622,736 B1 | 9/2003 | Hahn | |
| 6,652,747 B2 | 11/2003 | Hvarre | |
| 6,660,167 B1 | 12/2003 | Walder et al. | |
| 6,685,908 B1 | 2/2004 | Yaniv | |
| 6,686,325 B2 | 2/2004 | Hoyt et al. | |
| 6,693,071 B2 | 2/2004 | Ghosh et al. | |
| 6,694,989 B2 | 2/2004 | Everson et al. | |
| 6,777,384 B2 | 8/2004 | Raths et al. | |
| 6,794,345 B2 | 9/2004 | Elsner et al. | |
| 6,806,245 B2 | 10/2004 | Hahn | |
| 6,815,410 B2 | 11/2004 | Boutique et al. | |
| 6,835,702 B2 | 12/2004 | Herdt et al. | |
| 6,846,788 B2 * | 1/2005 | Everson et al. | 510/169 |
| 6,881,713 B2 | 4/2005 | Sommerville-Roberts et al. | |
| 6,916,777 B2 | 7/2005 | Connor et al. | |
| 6,992,052 B2 | 1/2006 | Song | |
| 7,026,278 B2 | 4/2006 | Price et al. | |
| 7,033,980 B2 * | 4/2006 | Waits et al. | 510/221 |
| 7,063,895 B2 | 6/2006 | Rodrigues et al. | |
| 7,077,963 B2 | 7/2006 | McConchie et al. | |
| 7,087,662 B2 | 8/2006 | Ghosh et al. | |
| 7,094,740 B2 | 8/2006 | Berger et al. | |
| 7,101,833 B2 | 9/2006 | Berger et al. | |
| 7,135,448 B2 | 11/2006 | Lentsch et al. | |
| 7,153,816 B2 | 12/2006 | Kessler et al. | |
| 7,196,044 B2 * | 3/2007 | Smith et al. | 510/225 |
| 7,223,723 B2 * | 5/2007 | Wilson | 510/366 |
| 7,241,726 B2 | 7/2007 | Song et al. | |
| 7,273,558 B2 | 9/2007 | Miecznik | |
| 7,320,957 B2 | 1/2008 | Brooker et al. | |
| 7,530,361 B2 * | 5/2009 | Killeen et al. | 134/25.2 |
| 2002/0071783 A1 | 6/2002 | Fader et al. | |
| 2002/0111285 A1 | 8/2002 | Price et al. | |
| 2002/0172773 A1 | 11/2002 | Ghosh et al. | |
| 2003/0008794 A1 | 1/2003 | Jaynes | |
| 2003/0008801 A1 | 1/2003 | Raths et al. | |
| 2003/0050205 A1 | 3/2003 | Hahn | |
| 2003/0073596 A1 | 4/2003 | Chiou et al. | |
| 2003/0078176 A1 | 4/2003 | Elsner et al. | |
| 2003/0111097 A1 | 6/2003 | Everson et al. | |
| 2003/0166492 A1 | 9/2003 | Holderbaum et al. | |
| 2003/0166493 A1 | 9/2003 | Holderbaum et al. | |
| 2004/0034905 A1 | 2/2004 | Underwood et al. | |
| 2004/0048760 A1 | 3/2004 | Rabon et al. | |
| 2004/0058846 A1 | 3/2004 | Kistenmacher et al. | |
| 2004/0121926 A1 | 6/2004 | Waits et al. | |
| 2004/0147427 A1 | 7/2004 | Waits et al. | |
| 2004/0162226 A1 | 8/2004 | Sunder et al. | |
| 2004/0167048 A1 | 8/2004 | Sunder et al. | |
| 2004/0176264 A1 | 9/2004 | Song et al. | |
| 2004/0176269 A1 | 9/2004 | Song | |
| 2004/0180807 A1 | 9/2004 | Song et al. | |
| 2004/0220068 A1 | 11/2004 | Hahn | |
| 2004/0259751 A1 | 12/2004 | Kessler et al. | |
| 2005/0003979 A1 | 1/2005 | Lentsch et al. | |
| 2005/0020464 A1 | 1/2005 | Smith et al. | |
| 2005/0075258 A1 | 4/2005 | Kessler et al. | |
| 2005/0087213 A1 | 4/2005 | Hahn | |
| 2005/0098499 A1 | 5/2005 | Hussain | |
| 2005/0113271 A1 | 5/2005 | Pegelow et al. | |
| 2005/0119150 A1 | 6/2005 | Pegelow et al. | |
| 2005/0119154 A1 | 6/2005 | Song et al. | |
| 2005/0137106 A1 | 6/2005 | Song et al. | |
| 2005/0143278 A1 | 6/2005 | Pegelow et al. | |
| 2005/0143280 A1 | 6/2005 | Nelson et al. | |
| 2005/0148479 A1 | 7/2005 | Barthel et al. | |
| 2005/0148488 A1 | 7/2005 | Jekel et al. | |
| 2005/0153868 A1 | 7/2005 | Berger et al. | |
| 2005/0155131 A1 | 7/2005 | Underwood et al. | |
| 2005/0181962 A1 | 8/2005 | Pegelow et al. | |
| 2005/0187136 A1 | 8/2005 | Pegelow et al. | |
| 2005/0187137 A1 | 8/2005 | Pegelow et al. | |
| 2005/0202989 A1 * | 9/2005 | Wilson | 510/245 |
| 2005/0225003 A1 | 10/2005 | Holderbaum et al. | |
| 2005/0233925 A1 | 10/2005 | Foley et al. | |
| 2005/0239680 A1 | 10/2005 | Buchmeier et al. | |
| 2005/0253116 A1 | 11/2005 | Hahn | |
| 2005/0261156 A1 | 11/2005 | Kottwitz et al. | |
| 2005/0261158 A1 | 11/2005 | Kottwitz et al. | |
| 2006/0030506 A1 | 2/2006 | Song et al. | |
| 2006/0035807 A1 | 2/2006 | Kasturi et al. | |
| 2006/0046954 A1 | 3/2006 | Smith et al. | |
| 2006/0069001 A1 | 3/2006 | Song | |
| 2006/0069002 A1 | 3/2006 | Song et al. | |
| 2006/0069003 A1 | 3/2006 | Song et al. | |
| 2006/0069004 A1 | 3/2006 | Song et al. | |
| 2006/0069005 A1 | 3/2006 | Song | |
| 2006/0075576 A1 | 4/2006 | Price et al. | |
| 2006/0079430 A1 | 4/2006 | Berger et al. | |
| 2006/0079437 A1 | 4/2006 | Kondo et al. | |
| 2006/0089294 A1 | 4/2006 | Depoot et al. | |
| 2006/0094634 A1 | 5/2006 | Jekel et al. | |
| 2006/0116304 A1 | 6/2006 | McRitchie et al. | |
| 2006/0116309 A1 | 6/2006 | Lambotte et al. | |
| 2006/0122089 A1 | 6/2006 | Lambotte et al. | |
| 2006/0123852 A1 | 6/2006 | Wiedemann et al. | |
| 2006/0128602 A1 | 6/2006 | Lentsch et al. | |
| 2006/0135394 A1 | 6/2006 | Smith et al. | |
| 2006/0157084 A1 | 7/2006 | Wiedemann et al. | |
| 2006/0189508 A1 | 8/2006 | Brooker et al. | |
| 2006/0194708 A1 | 8/2006 | Barthel et al. | |
| 2006/0199750 A1 | 9/2006 | Berger et al. | |
| 2006/0217286 A1 | 9/2006 | Geoffroy et al. | |
| 2006/0223734 A1 | 10/2006 | Bayersdoerfer et al. | |
| 2006/0223738 A1 | 10/2006 | Holderbaum et al. | |
| 2006/0234900 A1 | 10/2006 | Olson et al. | |
| 2006/0258556 A1 | 11/2006 | Holderbaum et al. | |
| 2006/0270580 A1 | 11/2006 | Smith et al. | |
| 2007/0017553 A1 | 1/2007 | Neplenbroek et al. | |
| 2008/0234164 A1 | 9/2008 | Tyborski | |
| 2008/0274928 A1 | 11/2008 | Smith et al. | |
| 2008/0274930 A1 | 11/2008 | Smith et al. | |
| 2008/0274932 A1 | 11/2008 | Smith et al. | |
| 2008/0274933 A1 | 11/2008 | Fernholz et al. | |
| 2008/0274939 A1 | 11/2008 | Monsrud et al. | |
| 2008/0276967 A1 | 11/2008 | Smith et al. | |
| 2008/0280800 A1 | 11/2008 | Smith et al. | |
| 2008/0287334 A1 | 11/2008 | Smith et al. | |
| 2008/0287335 A1 | 11/2008 | Smith | |
| 2008/0300160 A1 | 12/2008 | Smith et al. | |
| 2009/0054287 A1 | 2/2009 | Smith et al. | |
| 2009/0054290 A1 | 2/2009 | Fernholz et al. | |
| 2009/0149363 A1 | 6/2009 | Smith et al. | |
| 2009/0165818 A1 | 7/2009 | Smith et al. | |

FOREIGN PATENT DOCUMENTS

| | | | |
|---|---|---|---|
| EP | 0241962 | | 5/1990 |
| EP | 303761 | | 9/1992 |
| EP | 0406662 | | 3/1995 |
| EP | 130756 | | 6/2000 |
| EP | 0828812 | | 10/2001 |
| EP | 1253188 | | 10/2002 |
| GB | 607274 | | 8/1948 |
| GB | 784750 | | 12/1957 |
| GB | 1437950 | | 6/1976 |
| GB | 2109399 | A * | 6/1983 |
| JP | 4104885 | | 4/1992 |
| JP | 10118638 | | 5/1998 |
| JP | 2003-525104 | | 8/2003 |
| JP | 2005023089 | A * | 1/2005 |
| JP | 2007-292389 | | 11/2007 |
| KR | 810000367 | | 4/1981 |
| KR | 10-2004-0019262 | | 3/2004 |
| KR | 10-2006-0003294 | | 1/2006 |
| WO | WO92/03529 | | 3/1992 |
| WO | WO93/18140 | | 9/1993 |

| | | |
|---|---|---|
| WO | WO94/25583 | 11/1994 |
| WO | WO95/07791 | 3/1995 |
| WO | WO95/10591 | 4/1995 |
| WO | WO95/10615 | 4/1995 |
| WO | WO95/29979 | 11/1995 |
| WO | WO95/30010 | 11/1995 |
| WO | WO95/30011 | 11/1995 |
| WO | WO98/40455 | 9/1998 |
| WO | WO2006/128498 | 12/2006 |

OTHER PUBLICATIONS

Gibson, Aileen and Maniocha, Michael, "The Use of Magnesium Hydroxide Slurry for Biological Treatment of Municipal and Industrial Wastewater," Martin Marietta Magnesia Specialties, LLC, white paper, 7 pgs.

Jiao, Yunfeng, et al., "The co-effect of collagen and magnesium ions on calcium carbonate biomineralization", Materials Science and Engineering C26 (2006) 648-652.

Jung et al., "Effect of monovalent salts on morphology of calcium carbonate crystallized in Couette-Taylor reactor", Cryst. Res. Technol. 40, No. 6, 568-592 (2005), 7 pages.

Kitamura, Mitsutaka, "Crystallization and Transformation Mechanism of Calcium Carbonate Polymorphs and the Effect of Magnesium Ion", Journal of Colloid and Interface Science 236, 318-327 (2001), ISSN 0021-9797.

Kawaguchi, H. et al., "Crystallization of Inorganic Compounds in Polymer Solutions. Part I: Control of Shape and Form of Calcium Carbonate," Colloid Polym Sci, vol. 270, 1992, pp. 1176-1181.

Lee, Inhyung et al., "Nanoparticle-Directed Crystallization of Calcium Carbonate," Advanced Materials, Jul. 3, 2001, 4 pgs.

Loste, Eva et al., "The role of magnesium in stabilizing amorphous calcium carbonate and controlling calcite morpologies", Journal of Crystal Growth 254 (2003), pp. 206-218.

Meyer, H.J., "The Influence of Impurities on the Grown Rate of Calcite," Journal of Crystal Growth, vol. 66, 1984, pp. 639-646.

Takayuki, Saito and Takuhisa, Handa, "Improvement in the Water Recovery and Scale Prevention of an RO System," Ebara Engineering Review, vol. 199, 2003, pp. 30-34.

Woon-Kyoung Park, "Crystal Growth of Aragonite Precipitated Calcium Carbonate by Seeded Method,", Materials Science Forum vols. 544-545 (2007) pp. 693-696.

* cited by examiner

Replacement Sheet
Figure 2
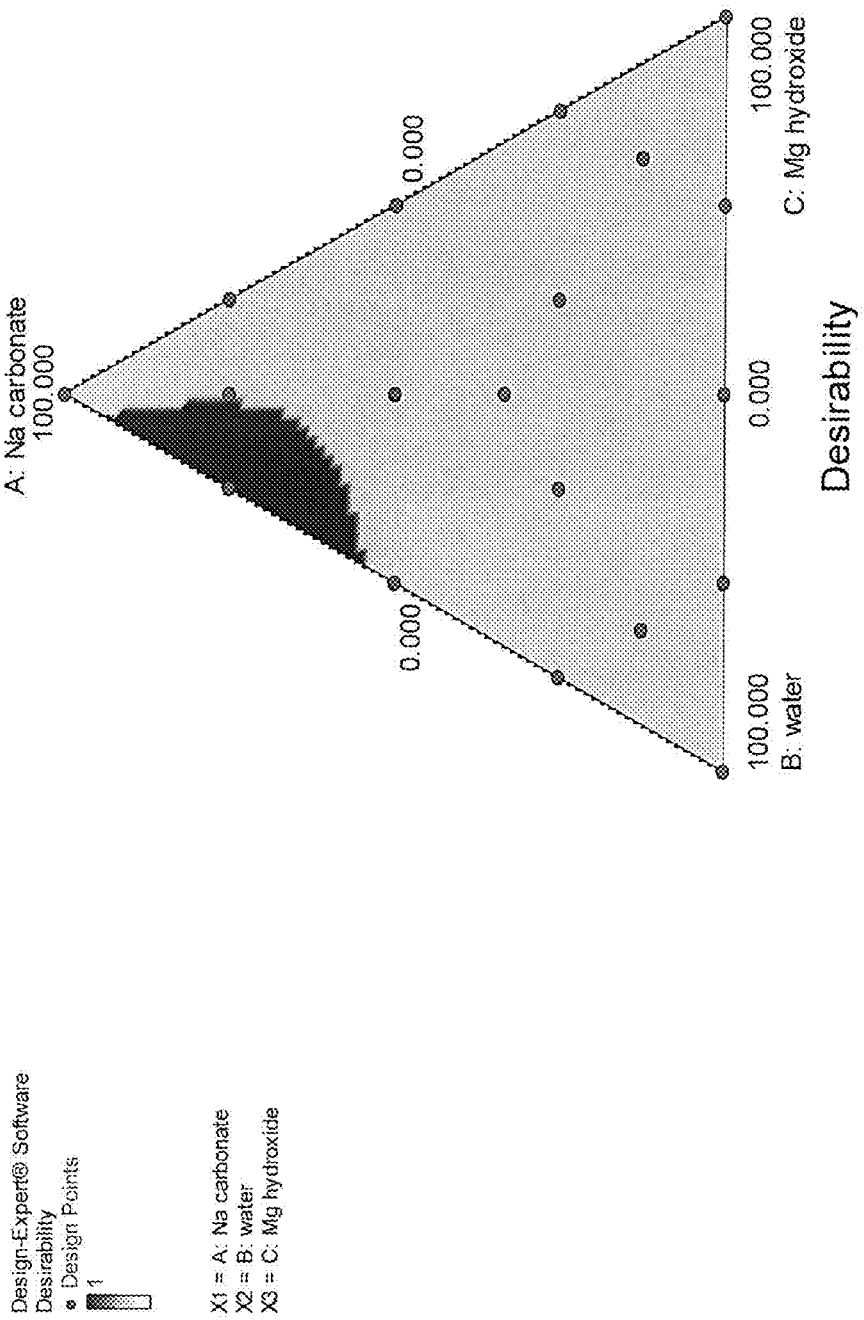

CLEANING COMPOSITIONS WITH WATER INSOLUBLE CONVERSION AGENTS AND METHODS OF MAKING AND USING THEM

CROSS REFERENCE TO RELATED APPLICATIONS

This application claims priority and is related to U.S. Provisional Application Ser. No. 60/927,575 filed on May 4, 2007 and entitled "Compositions Containing Magnesium Salts and Methods of Using." The entire contents of this patent application are hereby expressly incorporated herein by reference including, without limitation, the specification, claims, and abstract, as well as any figures, tables, or drawings thereof.

This application is also related to: U.S. patent application Ser. No. 12/114,355, entitled, "Composition For In Situ Manufacture Of Insoluble Hydroxide When Cleaning Hard Surfaces And For Use In Automatic Warewashing Machines, And Methods For Manufacturing And Using"; U.S. patent application Ser. No. 12/114,448, entitled "Water Treatment System and Downstream Cleaning Methods"; U.S. patent application Ser. No. 12/114,327, entitled "Water Soluble Magnesium Compounds as Cleaning Agents and Methods of Using Them"; U.S. patent application Ser. No. 12/114,513, entitled "Cleaning Compositions Containing Water Soluble Magnesium Compounds and Methods of Using Them", now U.S. Pat. No. 7,749,329; U.S. patent application Ser. No. 12/114,428, entitled "MG++ Chemistry and Method for Fouling Inhibition in Heat Processing of Liquid Foods and Industrial Processes"; U.S. patent application Ser. No. 12/114,329, entitled "Compositions Including Hardness Ion and Gluconate and Methods" Employing Them to Reduce Corrosion and Etch", now U.S. Pat. No. 7,709,434; U.S. patent application Ser. No. 12/114,342, entitled "Compositions Including Hardness Ion and Silicate and Methods" Employing Them to Reduce Corrosion and Etch", now U.S. Pat. No. 7,960,329; U.S. patent application Ser. No. 12/114,364, entitled "Compositions Including Hardness Ion and Threshold Agent and Methods" Employing Them to Reduce Corrosion and Etch"; and U.S. patent application Ser. No. 12/114,385, entitled "Warewashing Compositions for Use in Automatic Dishwashing Machines and Method for Using", all commonly assigned to Ecolab, Inc., are filed on the same date as this application being May 2, 2008 and are all incorporated herein by reference for all purposes.

FIELD OF THE INVENTION

The present invention relates to cleaning compositions comprising conversion agents, and methods of using them. In particular, solid cleaning compositions comprising conversion agents comprising water insoluble compounds are provided. The cleaning compositions can be substantially free of a builder, e.g., chelating agent, sequestrant, and/or threshold agent. Methods employing the cleaning compositions are also provided.

BACKGROUND

The level of hardness in water can have a deleterious effect in many systems. For example, when hard water alone, or in conjunction with cleaning compositions, contacts a surface, it can cause precipitation of hard water scale on the contacted surface. In general, hard water refers to water having a total level of calcium and magnesium ions in excess of about 100 ppm expressed in units of ppm calcium carbonate. Often, the molar ratio of calcium to magnesium in hard water is about 2:1 or about 3:1. Although most locations have hard water, water hardness tends to vary from one location to another.

Hard water is also known to reduce the efficacy of detergents. One method for counteracting this includes adding chelating agents or sequestrants into detersive compositions that are intended to be mixed with hard water in an amount sufficient to handle the hardness. However, in many instances the water hardness exceeds the chelating capacity of the composition. As a result, free calcium ions may be available to attack active components of the composition, to cause precipitation, or to cause other deleterious effects, such as poor cleaning effectiveness or lime scale build up.

SUMMARY

In some aspects, the present invention provides a solid cleaning composition comprising about 1 to about 50 wt % of a conversion agent comprising a water insoluble compound; and about 10 to about 95 wt % of an alkalinity source. The conversion agent causes calcium hardness ions in a water source to substantially precipitate in a non-calcite crystalline form. In some embodiments, the conversion agent is selected from the group consisting of metal oxides, metal hydroxides, and combinations thereof. In other embodiments, the conversion agent is selected from the group consisting of magnesium oxide, aluminum oxide, titanium oxide, and combinations thereof. In still yet other embodiments, the conversion agent is selected from the group consisting of magnesium hydroxide, aluminum hydroxide, titanium hydroxide and combinations thereof.

In some embodiments, the non-calcite crystalline form is aragonite. In other embodiments, the conversion agent further comprises aragonite. In still yet other embodiments, the conversion agent further comprises about 1 to about 50 wt % of aragonite.

In some embodiments, the alkalinity source is selected from the group consisting of an alkali metal carbonate, an alkali metal hydroxide, and combinations thereof. In some embodiments, the alkali metal carbonate is selected from the group consisting of sodium carbonate, potassium carbonate, lithium carbonate, sodium bicarbonate, potassium bicarbonate, lithium bicarbonate, sodium sesquicarbonate, potassium sesquicarbonate, lithium sesquicarbonate, and combinations thereof. In still yet other embodiments, the alkali metal hydroxide is selected from the group consisting of sodium hydroxide, lithium hydroxide, potassium hydroxide, and combinations thereof.

In some embodiments, the composition further comprises about 1 to about 7 wt % of a builder. In other embodiments, the composition is substantially free of a builder. In other embodiments, the composition further comprises about 1 to about 50 wt % of a salt. In some embodiments, the salt is selected from the group consisting of monovalent alkali compounds having halide or sulfate as the anion. In some embodiments, the composition further comprises about 1 to about 50 wt % water.

In some embodiments, the composition further comprises a surfactant selected from the group consisting of nonionic surfactants, cationic surfactants, anionic surfactants, amphoteric surfactants, or combinations thereof. In other embodiments, the surfactant is a nonionic low foaming surfactant.

In some embodiments, the composition comprises: about 5 to about 30 wt % of the conversion agent; and about 20 to about 75% of the alkalinity source. In other embodiments, the composition comprises about 10 to about 20 wt % of the conversion agent; and about 25 to about 65 wt % of the alkalinity source.

In some aspects, the present invention provides a solid cleaning composition comprising: about 3 to about 30 wt % of a conversion agent comprising a water insoluble compound; and about 5 to about 90 wt % of an ingredient selected from the group consisting of a salt, a detergent filler, a surfactant, a processing aid, water and combinations thereof, wherein the conversion agent causes calcium hardness ions in a water source to substantially precipitate in a non-calcite crystalline form. In some embodiments, the composition comprises less than 1 wt % phosphate. In other embodiments, the composition comprises less than 1 wt % phosphorus.

In some aspects, the present invention provides a method of cleaning an article. The method comprises: (a) providing a solid cleaning composition comprising: (i) about 1 to about 50 wt % of a conversion agent comprising a water insoluble compound; and (ii) about 10 to about 95 wt % of an alkalinity source, wherein the conversion agent causes calcium hardness ions in a water source to substantially precipitate in a non-calcite crystalline form; (b) dissolving at least a portion of the solid cleaning composition to create a use solution; and (c) contacting the article with the use solution, such that the article is cleaned. In some embodiments, the article is selected from the group consisting of a medical device, a laundry article, an article of ware, a hard surface, and combinations thereof. In other embodiments, the method is used in a presoak application. In still yet other embodiments, the method is used in a rinse application.

In some aspects, the present invention provides a method of cleaning an article. The method comprises: (a) providing a solid cleaning composition consisting essentially of: (i) about 3 to about 30 wt % of a conversion agent comprising a water insoluble compound; and (ii) about 5 to about 90 wt % of an ingredient selected from the group consisting of a salt, a detergent filler, a surfactant, a processing aid, water and combinations thereof, wherein the conversion agent causes calcium hardness ions in a water source to substantially precipitate in a non-calcite crystalline form; (b) dissolving at least a portion of the solid cleaning composition to create a use solution; and (c) contacting the article with the use solution, such that the article is cleaned. In some embodiments, the article is selected from the group consisting of a medical device, a laundry article, an article of ware, a hard surface, and combinations thereof. In other embodiments, the method is used in a presoak application. In some embodiments, the method is used in a rinse application.

These and other embodiments will be apparent to these of skill in the art and others in view of the following detailed description. It should be understood, however, that this summary and the detailed description illustrate only some examples, and are not intended to be limiting to the invention as claimed.

BRIEF DESCRIPTION OF DRAWINGS

FIGS. 1 and 2 show a ternary graphs illustrating solidification of a composition including a conversion agent, i.e., an insoluble magnesium compound, as a function of the concentrations of conversion agent compound, source of alkalinity, and water.

DETAILED DESCRIPTION

Figure 1:
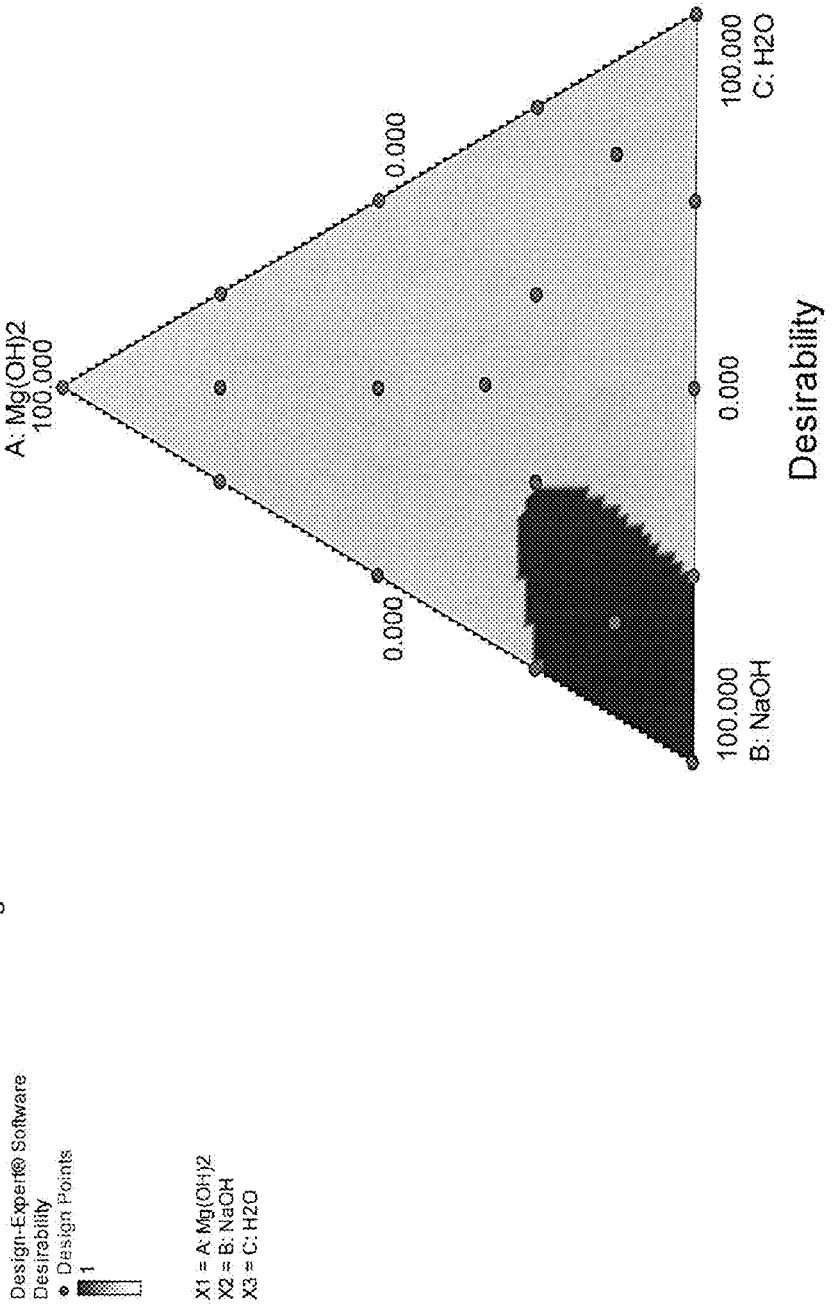

The present invention relates to cleaning compositions, e.g., solid cleaning compositions, comprising a conversion agent. In some aspects, the composition comprises a conversion agent, e.g., a metal oxide or hydroxide or a polymorph of calcium carbonate, wherein the conversion agent causes calcium hardness ions in a water source to substantially precipitate in a non-calcite crystalline form. In some embodiments, a source of a water insoluble or slightly water soluble conversion agent is included in the compositions of the present invention. The compositions of the present invention have many beneficial effects, including, but not limited to, reducing or eliminating the need for specific chemistries, e.g., threshold agents, chelating agents, or sequestrants, or phosphorous, in the cleaning compositions, reducing scale and soiling in areas where hard water can cause soiling, and protecting equipment, e.g., industrial equipment, from scale build up.

So that the invention may be more readily understood certain terms are first defined.

As used herein, the term "builder" refers to a compound that is a threshold agent, chelating agent or sequestering agent.

As used herein, the terms "chelating agent" and "sequestrant" refer to a compound that forms a complex (soluble or not) with water hardness ions (from the wash water, soil and substrates being washed) in a specific molar ratio. Chelating agents that can form a water soluble complex include sodium tripolyphosphate, EDTA, DTPA, NTA, citrate, and the like. Sequestrants that can form an insoluble complex include sodium triphosphate, zeolite A, and the like. As used herein, the terms "chelating agent" and "sequestrant" are synonymous.

As used herein, the term "free of chelating agent" or "substantially free of chelating agent" refers to a composition, mixture, or ingredients that does not contain a chelating agent or sequestrant or to which only a limited amount of a chelating agent or sequestrant has been added. Should a chelating agent or sequestrant be present, the amount of a chelating agent or sequestrant shall be less than about 7 wt %. In some embodiments, such an amount of a chelating agent or sequestrant is less than about 2 wt-%. In other embodiments, such an amount of a chelating agent or sequestrant is less then about 0.5 wt-%. In still yet other embodiments, such an amount of a chelating agent or sequestrant is less than about 0.1 wt-%.

As used herein, the term "lacking an effective amount of chelating agent" refers to a composition, mixture, or ingredients that contains too little chelating agent or sequestrant to measurably affect the hardness of water.

As used herein, the term "conversion agent" refers to a species that causes solubilized calcium in water to substantially precipitate from solution as calcium carbonate in a form which is thought to be the thermodynamically unfavorable crystal form aragonite rather than as the thermodynamically favorable crystal form calcite. Aragonite is a fragile crystal which doesn't bind well to surfaces and doesn't form hard water scale while calcite is a more robust crystal which binds tightly to surfaces, forming a hard water scale that's not seen with aragonite.

As used herein, the term "solubilized water hardness" refers to hardness minerals dissolved in ionic form in an aqueous system or source, i.e., $Ca^{++}$ and $Mg^{++}$. Solubilized water hardness does not refer to hardness ions when they are in a precipitated state, i.e., when the solubility limit of the various compounds of calcium and magnesium in water is exceeded and those compounds precipitate as various salts such as, for example, calcium carbonate and magnesium carbonate. As used herein, the term "water soluble" refers to a compound that can be dissolved in water at a concentration of more than 1 wt-%.

As used herein, the terms "slightly soluble" or "slightly water soluble" refer to a compound that can be dissolved in water only to a concentration of 0.1 to 1.0 wt-%.

As used herein, the term "water insoluble" refers to a compound that can be dissolved in water only to a concentration of less than 0.1 wt-%. For example, magnesium oxide is considered to be insoluble as it has a water solubility (wt %) of about 0.00062 in cold water, and about 0.00860 in hot water. Other insoluble compounds for use with the methods of the present invention include, for example: magnesium hydroxide with a water solubility of 0.00090 in cold water and 0.00400 in hot water; aragonite with a water solubility of 0.00153 in cold water and 0.00190 in hot water; and calcite with a water solubility of 0.00140 in cold water and 0.00180 in hot water.

As used herein, the term "threshold agent" refers to a compound that inhibits crystallization of water hardness ions from solution, but that need not form a specific complex with the water hardness ion. This distinguishes a threshold agent from a chelating agent or sequestrant. Threshold agents include a polyacrylate, a polymethacrylate, an olefin/maleic copolymer, and the like.

As used herein, the term "free of threshold agent" or "substantially free of threshold agent" refers to a composition, mixture, or ingredient that does not contain a threshold agent or to which only a limited amount of a threshold agent has been added. Should a threshold agent be present, the amount of a threshold agent shall be less than about 7 wt %. In some embodiments, such an amount of a threshold agent is less than about 2 wt-%. In other embodiments, such an amount of a threshold agent is less then about 0.5 wt-%. In still yet other embodiments, such an amount of a threshold agent is less than about 0.1 wt-%.

As used herein, the term "antiredeposition agent" refers to a compound that helps keep a soil composition suspended in water instead of redepositing onto the object being cleaned.

As used herein, the term "phosphate-free" or "substantially phosphate-free" refers to a composition, mixture, or ingredient that does not contain a phosphate or phosphate-containing compound or to which a phosphate or phosphate-containing compound has not been added. Should a phosphate or phosphate-containing compound be present through contamination of a phosphate-free composition, mixture, or ingredients, the amount of phosphate shall be less than about 1.0 wt %. In some embodiments, the amount of phosphate is less than about 0.5 wt %. In other embodiments, the amount of phosphate is less then about 0.1 wt %. In still yet other embodiments, the amount of phosphate is less than about 0.01 wt %.

As used herein, the term "phosphorus-free" or "substantially phosphorus-free" refers to a composition, mixture, or ingredient that does not contain phosphorus or a phosphorus-containing compound or to which phosphorus or a phosphorus-containing compound has not been added. Should phosphorus or a phosphorus-containing compound be present through contamination of a phosphorus-free composition, mixture, or ingredients, the amount of phosphorus shall be less than about 1.0 wt %. In some embodiments, the amount of phosphorous is less than about 0.5 wt %. In other embodiments, the amount of phosphorus is less than about 0.1 wt %. In still yet other embodiments, the amount of phosphorus is less than about 0.01 wt %.

By the term "solid" as used to describe a composition of the present invention, it is meant that the hardened composition will not flow perceptibly and will substantially retain its shape under moderate stress or pressure or mere gravity, as for example, the shape of a mold when removed from the mold, the shape of an article as formed upon extrusion from an extruder, and the like. The degree of hardness of the solid composition can range from that of a fused solid block which is relatively dense and hard, for example, like concrete, to a consistency characterized as being malleable and sponge-like, similar to caulking material.

"Cleaning" means to perform or aid in soil removal, bleaching, microbial population reduction, or combination thereof.

As used herein, the term "ware" refers to items such as eating and cooking utensils and other hard surfaces such as showers, sinks, toilets, bathtubs, countertops, windows, mirrors, transportation vehicles, and floors. As used herein, the term "warewashing" refers to washing, cleaning, or rinsing ware.

As used herein, the term "hard surface" includes showers, sinks, toilets, bathtubs, countertops, windows, mirrors, transportation vehicles, floors, and the like. As used herein, the phrase "health care surface" refers to a surface of an instrument, a device, a cart, a cage, furniture, a structure, a building, or the like that is employed as part of a health care activity. Examples of health care surfaces include surfaces of medical or dental instruments, of medical or dental devices, of autoclaves and sterilizers, of electronic apparatus employed for monitoring patient health, and of floors, walls, or fixtures of structures in which health care occurs. Health care surfaces are found in hospital, surgical, infirmity, birthing, mortuary, and clinical diagnosis rooms. These surfaces can be those typified as "hard surfaces" (such as walls, floors, bed-pans, etc.,), or fabric surfaces, e.g., knit, woven, and non-woven surfaces (such as surgical garments, draperies, bed linens, bandages, etc.,), or patient-care equipment (such as respirators, diagnostic equipment, shunts, body scopes, wheel chairs, beds, etc.,), or surgical and diagnostic equipment. Health care surfaces include articles and surfaces employed in animal health care.

As used herein, the term "instrument" refers to the various medical or dental instruments or devices that can benefit from cleaning using water treated according to the methods of the present invention.

As used herein, the phrases "medical instrument," "dental instrument," "medical device," "dental device," "medical equipment," or "dental equipment" refer to instruments, devices, tools, appliances, apparatus, and equipment used in medicine or dentistry. Such instruments, devices, and equipment can be cold sterilized, soaked or washed and then heat sterilized, or otherwise benefit from cleaning using water treated according to the present invention. These various instruments, devices and equipment include, but are not limited to: diagnostic instruments, trays, pans, holders, racks, forceps, scissors, shears, saws (e.g. bone saws and their blades), hemostats, knives, chisels, rongeurs, files, nippers, drills, drill bits, rasps, burrs, spreaders, breakers, elevators, clamps, needle holders, carriers, clips, hooks, gouges, curettes, retractors, straightener, punches, extractors, scoops, keratomes, spatulas, expressors, trocars, dilators, cages, glassware, tubing, catheters, cannulas, plugs, stents, scopes (e.g., endoscopes, stethoscopes, and arthoscopes) and related equipment, and the like, or combinations thereof.

As used herein, "weight percent (wt-%)," "percent by weight," "% by weight," and the like are synonyms that refer to the concentration of a substance as the weight of that substance divided by the total weight of the composition and multiplied by 100.

As used herein, the term "about" modifying the quantity of an ingredient in the compositions of the invention or employed in the methods of the invention refers to variation in the numerical quantity that can occur, for example, through typical measuring and liquid handling procedures used for making concentrates or use solutions in the real world; through inadvertent error in these procedures; through differences in the manufacture, source, or purity of the ingredients employed to make the compositions or carry out the methods; and the like. The term about also encompasses amounts that differ due to different equilibrium conditions for a composition resulting from a particular initial mixture. Whether or not modified by the term "about," the claims include equivalents to the quantities.

Compositions

In some aspects, the present invention provides a composition comprising a conversion agent comprising a water insoluble compound. In some embodiments, the composition is a solid cleaning composition. The composition can include additional ingredients including, but not limited to, an alkalinity source, a salt, a detergent filler, a surfactant, a processing aid, and/or water. In some embodiments, the compositions are substantially free of a builder, e.g., a chelating agent, sequestrant, and/or threshold agent. In some aspects, the present invention also provides methods of cleaning, and of reducing hard water scale or scum using the compositions of the present invention.

Some examples of representative constituent concentrations for embodiments of the present compositions can be found in Tables A and B, in which the values are given in wt-% of the ingredients in reference to the total composition weight. In certain embodiments, the proportions and amounts in Tables A and B can be modified by "about".

TABLE A

| Ingredient | wt-% | wt-% | wt-% |
|---|---|---|---|
| Conversion agent | 1-50 | 5-30 | 10-20 |
| Alkalinity Source | 10-95 | 20-75 | 25-65 |
| Builder | 0-7 | 0-5 | 0-2 |
| Salt | 0-50 | 0-40 | 0-30 |

TABLE B

| Ingredient | wt-% | wt-% | wt-% | wt-% |
|---|---|---|---|---|
| Conversion Agent | 1-95 | 2-50 | 3-30 | |
| Inorganic additive | 1-70 | 2-50 | 3-30 | |
| Surfactant | 0.01-20 | 0.1-10 | 0.2-5 | |
| pH Modifier | 1-70 | 2-50 | 3-30 | |
| Processing Aid | 1-70 | 2-50 | 3-30 | |

Without wishing to be bound by any particular theory, it is thought that the conversion agents for use with the methods of the present invention cause solubilized calcium water hardness ions in a water source to substantially precipitate from solution as calcium carbonate in the thermodynamically unfavorable crystal form aragonite rather than as the thermodynamically favorable crystal form calcite. Aragonite is a fragile crystal which doesn't bind well to surfaces and doesn't form hard water scale while calcite is a more robust crystal which binds tightly to surfaces, forming a hard water scale that's not seen with aragonite. Thus, contacting water with a composition comprising a conversion agent of the present invention reduces the solubilized water hardness of the water. It is also thought that the action of the conversion agent can be viewed as a catalytic action or a catalytic interfacial surface interaction with the calcium containing composition, e.g., hard water. This reduction in the solubilized water hardness has many beneficial effects, including reducing the scale formation on a surface in contact with a use solution comprising water and a composition of the present invention. Further, the inclusion of a conversion agent in the compositions of the present invention substantially reduces or eliminates the need to include builders in the compositions.

Unexpectedly, the present compositions achieve these benefits from a conversion agent comprising an insoluble compound, e.g., magnesium oxide or hydroxide. It might be expected that a conversion agent would have to be water soluble to provide a benefit. If a water soluble magnesium salt is used, the water soluble magnesium ion is required to be in molar excess over calcium ion to provide benefits against hard water. However, the present compositions achieve benefits from a magnesium compound that provides only very low levels of magnesium ion in solution, benefiting from what is theorized to be a solid-liquid interfacial catalytic effect of the insoluble magnesium compound. For example, magnesium hydroxide is very insoluble, according to the scientific literature, dissolving in neutral water only to the extent of about 6 ppm, more at acid pH. This is a concentration of only about 0.006 wt-%.

Conversion Agents

In some embodiments, the compositions of the present invention comprise a conversion agent comprising a water insoluble compound. Conversion agents suitable for use with the compositions and methods of the present invention include, but are not limited to metal oxides, metal hydroxides, polymorphs of calcium carbonate and combinations and mixtures thereof. In some embodiments, the conversion agent comprises a metal oxide. Metal oxides suitable for use in the methods of the present invention include, but are not limited to, magnesium oxide, aluminum oxide, titanium oxide, and combinations and mixtures thereof. Metal hydroxides suitable for use with the methods of the present invention include, but are not limited to, magnesium hydroxide, aluminum hydroxide, titanium hydroxide, and combinations and mixtures thereof. Polymorphs of calcium carbonate suitable for use as a conversion agent with the methods of the present invention include, but are not limited to, aragonite. In some embodiments, magnesium oxide is used as a conversion agent to treat water. In some embodiments, magnesium hydroxide is used as a conversion agent to treat water. In still yet other embodiments, a combination of magnesium oxide and hydroxide are used as a conversion agent to treat water.

In some embodiments the conversion agent selected for use with the methods of the present invention is slightly soluble in water. In some embodiments, the conversion agent selected for use with the methods of the present invention is insoluble in water. In some embodiments, a conversion agent selected for use with the methods of the present invention has a solubility of less than about 0.01 g/100 mL in water. In some embodiments, low solubility is preferred for longer conversion agent activity.

In some embodiments, the compositions of the present invention comprise about 1 to about 50 wt %, about 5 to about 30 wt %, or about 10 to about 20 wt % of a conversion agent, or combination of conversion agents. It is to be understood that all numbers and ranges between these numbers and ranges are encompassed by the present invention.

Alkalinity Source

In some embodiments, the compositions of the present invention further comprise one or more alkaline sources. The alkaline source can be selected such that it enhances the cleaning of an article, and improves the soil removal performance of the composition. In general, an effective amount of one or more alkaline sources should be considered as an amount that provides a use composition having a pH of at least about 8. When the use composition has a pH of between about 8 and about 10, it can be considered mildly alkaline, and when the pH is greater than about 12, the use composition can be considered caustic. In general, it is desirable to provide the use composition as a mildly alkaline cleaning composition because it is considered to be more safe than the caustic based use compositions.

The cleaning composition can include an alkali metal carbonate and/or an alkali metal hydroxide as a suitable alkaline source. Suitable metal carbonates that can be used include, for example, sodium carbonate, potassium carbonate, lithium carbonate, sodium bicarbonate, potassium bicarbonate, lithium bicarbonate, sodium sesquicarbonate, potassium sesquicarbonate, lithium sesquicarbonate, and combinations thereof. Suitable alkali metal hydroxides that can be used include, for example, sodium hydroxide, lithium hydroxide, potassium hydroxide, and combinations thereof. An alkali metal hydroxide can be added to the composition in the form of solid beads, dissolved in an aqueous solution, or a combination thereof. Alkali metal hydroxides are commercially available as a solid in the form of prilled solids or beads having a mix of particle sizes ranging from about 12-100 U.S. mesh, or as an aqueous solution, as for example, as a 50 wt-% and a 73 wt-% solution.

In some embodiments, the compositions of the present invention comprise an alkaline source in an amount of at least about 5 wt-%, at least about 10 wt-%, or at least about 15 wt-%. The cleaning compositions can include about 10 to about 95 wt-%, about 20 to about 75 wt-%, or about 25 to about 65 wt-% of a source of alkalinity. It is to be understood that all ranges and values between these ranges and values are encompassed by the present invention In some embodiments, the alkaline source can be provided in an amount of less than about 60 wt-%. In addition, the alkaline source can be provided at a level of less than about 40 wt-%, less than about 30 wt-%, or less than about 20 wt-%. In certain embodiments, it is expected that the solid cleaning composition can provide a use composition that is useful at pH levels below about 8. In such compositions, an alkaline source can be omitted, and additional pH adjusting agents can be used to provide the use composition with the desired pH. Accordingly, it should be understood that the source of alkalinity can be characterized as an optional component.

Secondary Alkalinity Sources

Compositions of the present invention can also include a secondary alkaline source separate from the source of alkalinity discussed above. The secondary source of alkaline can comprise about 0 to about 75 wt-%, about 0.1 to about 70 wt-%, about 1 to about 25 wt-%, about 20 to about 60 wt-%, or about 30 to about 70 wt-% of the total composition.

Secondary alkalinity sources can include, for example, inorganic alkalinity sources, such as an alkali metal hydroxide or silicate, or the like. Suitable alkali metal hydroxides include, for example, sodium, potassium, or lithium hydroxide. An alkali metal hydroxide may be added to the composition in a variety of forms, including for example in the form of solid beads, dissolved in an aqueous solution, or a combination thereof. Examples of useful alkaline metal silicates include sodium, potassium, or lithium silicate (with a $M_2O$:$SiO_2$ ratio of 1:1.8 to 5:1, M representing an alkali metal) or metasilicate.

Other sources of alkalinity include: a metal borate such as sodium or potassium borate; ethanolamines and amines; and other like alkaline sources.

Builder

In some embodiments, the compositions of the present invention comprise about 0 to about 5 wt %, about 0 to about 4 wt %, or about 0 to about 2 wt % of a builder. In other embodiments, the compositions of the present invention are substantially free of a builder. If a builder is present in the compositions of the present invention, it is a builder incapable of chelating a significant amount, or any, of the conversion agent, e.g., magnesium oxide or hydroxide, present in the composition. Such a builder can increase the molar ratio of Mg/Ca in a use solution, which can reduce the amount of conversion agent required in the compositions of the present invention.

In some embodiments, the compositions of the present invention are substantially free of a builder, e.g., a chelating, sequestering, or threshold agent. Chelating agents or sequestrants include, but are not limited to, phosphonates, phosphates, aminocarboxylates, and polycarboxylates.

In some embodiments, the compositions of the present invention lack an effective amount of a builder. An ineffective amount of builder will vary with the hardness of the water and the dilution rate of a concentrate. For example, for 17 grain hard water, an ineffective amount of a chelating agent or sequestrant in a use composition can be less than about 15 wt %. This is based on a composition used at a 1000 ppm concentration and STPP as a chelating agent/sequestrant. This 15 wt % STPP would chelate about 25% of the hardness ions present. In some embodiments, an ineffective amount is less than about 15 wt %, less than about 5 wt % or less than about 1 wt %. The effective level of a chelating agent or sequestrant will be dependent upon the chemical structure of the compound and the dilution rate of the formulation containing it.

Inorganic Additives

In some embodiments, the compositions of the present invention can further comprise an inorganic additive, i.e., a salt. Without wishing to be bound by any particular theory, it is thought that the salt can modify the activity of the conversion agent, e.g., magnesium oxide or hydroxide. Specifically, the addition of salts has been observed to provide advantageous control of hard water scaling, processing modification, and dissolution rate modification. Without wishing to be bound by any particular theory, it is also thought, that the salt can alter the crystal habit of calcium carbonate crystals that are formed in a water source when the water source is contacted with the conversion agents of the present invention.

Suitable salts include monovalent cations, polyvalent cations, monovalent anions, and polyvalent anions. Suitable monovalent cations include those selected from the group consisting of potassium ion, sodium ion, lithium ion, cesium ion, and combinations thereof. Suitable polyvalent cations include those selected from the group consisting of cations of Sr, Ca, V, Fe, Ti, Zn, Al, Mn, Cu, and combinations thereof. Suitable monovalent anions include those selected from the group consisting of hydroxide, chloride, bromide, iodide, fluoride, bicarbonate, hydrogen sulfate, acetate, formate, and combinations thereof. Suitable polyvalent anions include those selected from the group consisting of sulfate, sulfite, nitrate, carbonate, aluminate, titanate, silicate, oxide, and combinations thereof.

Suitable hydroxide ion containing salts include those selected from the group consisting of sodium, lithium, potassium, calcium, cesium, strontium hydroxide salts, and combinations thereof. Additional suitable salts include oxides, hydroxides, and salts of: aluminum, iron, alkali metals, calcium, silicon, tin, zinc, titanium, and their mixed salts with each other and magnesium (huntite, dolomite, etc.); quartz, limestone, collagen, polyacrylamides, double hydrophilic polymers (PEG-methacrylate copolymers, etc.), polypeptides, amino acids and their homopolymers (polyaspartate, polyglutamate, etc.), and urea. Suitable salts include shell, quartz, limestone, the oxide and hydroxide and salts of aluminum, titanium, zinc, tin, silicon, and combinations thereof.

The salt can be present at amounts of about 1 to about 50 wt-%, about 1 to about 40 wt-%, or about 1 to about 30 wt-%. It is to be understood that all values and ranges between these values and ranges are encompassed by the compositions of the present invention.

Water

In some embodiments, the present cleaning composition can include water. Water can be independently added to the composition or can be provided in the composition as a result of its presence in an aqueous material that is added to the composition. Typically, water is introduced into the composition to provide the composition with a desired flowability prior to solidification and to provide a desired rate of solidification. Water can be added to form cleaning composition physical forms such as a solid, a slurry, a gel, and/or a paste.

In some embodiments, the composition comprises about 1 to about 50 wt % water, about 10 to about 40 wt % water, or about 20 to about 30 wt % water. In some embodiments, the compositions of the present invention comprise at least about 15 wt % water. It is to be understood that all values and ranges between these values and ranges are encompassed by the present invention.

Organic Surfactants or Cleaning Agents

In some embodiments, the composition can comprise at least one cleaning agent which can be a surfactant or surfactant system. A variety of surfactants can be used in a cleaning composition, including anionic, nonionic, cationic, and zwitterionic surfactants, which are commercially available from a number of sources. Suitable surfactants include nonionic surfactants. Suitable nonionic surfactants include low foaming non-ionic surfactants. For a discussion of surfactants, see Kirk-Othmer, Encyclopedia of Chemical Technology, Third Edition, volume 8, pages 900-912.

Nonionic surfactants that are useful in the present cleaning compositions include those having a polyalkylene oxide polymer as a portion of the surfactant molecule. Such nonionic surfactants include, for example, chlorine-, benzyl-, methyl-, ethyl-, propyl-, butyl- and other like alkyl-capped polyethylene and/or polypropylene glycol ethers of fatty alcohols; polyalkylene oxide free nonionics such as alkyl polyglycosides; sorbitan and sucrose esters and their ethoxylates; alkoxylated ethylene diamine; carboxylic acid esters such as glycerol esters, polyoxyethylene esters, ethoxylated and glycol esters of fatty acids, and the like; carboxylic amides such as diethanolamine condensates, monoalkanolamine condensates, polyoxyethylene fatty acid amides, and the like; and ethoxylated amines and ether amines commercially available from Tomah Corporation and other like nonionic compounds. Silicone surfactants such as the ABIL B8852 (Goldschmidt) can also be used.

Additional suitable nonionic surfactants having a polyalkylene oxide polymer portion include nonionic surfactants of C6-C24 alcohol ethoxylates (e.g., C6-C14 alcohol ethoxylates) having 1 to about 20 ethylene oxide groups (e.g., about 9 to about 20 ethylene oxide groups); C6-C24 alkylphenol ethoxylates (e.g., C8-C10 alkylphenol ethoxylates) having 1 to about 100 ethylene oxide groups (e.g., about 12 to about 20 ethylene oxide groups); C6-C24 alkylpolyglycosides (e.g., C6-C20 alkylpolyglycosides) having 1 to about 20 glycoside groups (e.g., about 9 to about 20 glycoside groups); C6-C24 fatty acid ester ethoxylates, propoxylates or glycerides; and C4-C24 mono or dialkanolamides.

Specific alcohol alkoxylates include alcohol ethoxylate propoxylates, alcohol propoxylates, alcohol propoxylate ethoxylate propoxylates, alcohol ethoxylate butoxylates, and the like; nonylphenol ethoxylate, polyoxyethylene glycol ethers and the like; and polyalkylene oxide block copolymers including an ethylene oxide/propylene oxide block copolymer such as those commercially available under the trademark PLURONIC (BASF-Wyandotte), and the like.

In some embodiments, a suitable nonionic surfactant for use with the methods of the present invention includes low foaming nonionic surfactants. Examples of suitable low foaming nonionic surfactants include secondary ethoxylates, such as those sold under the trade name TERGITOL™, such as TERGITOL™ 15-S-7 (Union Carbide), Tergitol 15-S-3, Tergitol 15-S-9 and the like. Other suitable classes of low foaming nonionic surfactant include alkyl or benzyl-capped polyoxyalkylene derivatives and polyoxyethylene/polyoxypropylene copolymers.

A useful nonionic surfactant for use as a defoamer is nonylphenol having an average of 12 moles of ethylene oxide condensed thereon, it being end capped with a hydrophobic portion comprising an average of 30 moles of propylene oxide. Silicon-containing defoamers are also well-known and can be employed in the compositions and methods of the present invention.

Suitable amphoteric surfactants include amine oxide compounds having the formula:

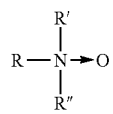

where R, R', R", and R'" are each a $C_1$-$C_{24}$ alkyl, aryl or aralkyl group that can optionally contain one or more P, O, S or N heteroatoms.

Another class of suitable amphoteric surfactants includes betaine compounds having the formula:

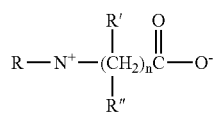

where R, R', R" and R'" are each a $C_1$-$C_{24}$ alkyl, aryl or aralkyl group that can optionally contain one or more P, O, S or N heteroatoms, and n is about 1 to about 10.

Suitable surfactants include food grade surfactants, linear alkylbenzene sulfonic acids and their salts, and ethylene oxide/propylene oxide derivatives sold under the Pluronic™ trade name. Suitable surfactants include those that are compatible as an indirect or direct food additive or substance; especially those described in the Code of Federal Regulations (CFR), Title 21—Food and Drugs, parts 170 to 186 (which is incorporated herein by reference).

Anionic surfactants suitable for the present cleaning compositions, include, for example, carboxylates such as alkyl-carboxylates (carboxylic acid salts) and polyalkoxycarboxylates, alcohol ethoxylate carboxylates, nonylphenol ethoxylate carboxylates, and the like; sulfonates such as alkylsulfonates, alkylbenzenesulfonates, alkylarylsulfonates, sulfonated fatty acid esters, and the like; sulfates such as sulfated alcohols, sulfated alcohol ethoxylates, sulfated alkylphenols, alkylsulfates, sulfosuccinates, alkylether sulfates, and the like; and phosphate esters such as alkylphosphate esters, and the like. Suitable anionics include sodium alkylarylsulfonate, alpha-olefin sulfonate, and fatty alcohol sulfates. Examples of suitable anionic surfactants include sodium dodecylbenzene sulfonic acid, potassium laureth-7 sulfate, and sodium tetradecenyl sulfonate.

The surfactant can be present at amounts of about 0.01 to about 60 wt-%, about 0.1 to about 30 wt-%, about 0.2 to about 15 wt-%, about 0.5 to about 10 wt-%, about 0.8 to about 8 wt-%, about 1 wt-% to about 6 wt-%, or about 2 wt-% to about 4 wt-%.

pH Modifier

In some embodiments, the compositions of the present invention further comprise a pH modifier. The pH modifier can be an organic or inorganic source of alkalinity or a pH buffering agent. Nonlimiting examples include the alkali metal hydroxides, alkali metal carbonates, alkanolamines, and/or salts of weak organic acids. Suitable pH modifiers include sodium hydroxide, lithium hydroxide, potassium hydroxide, calcium hydroxide, sodium carbonate, lithium carbonate, potassium carbonate, calcium carbonate (in aragonite form), and mixtures thereof. Suitable pH modifiers include acetate, formate, and the like. Suitable pH modifiers have no or only weak calcium sequestration capability at the pH of the use solution.

The pH modifier can be present at amounts of about 1 to about 70 wt-%, about 2 to about 50 wt-%, about 3 to about 30 wt-%, about 0.01 to about 60 wt-%, about 0.1 to about 30 wt-%, about 0.2 to about 15 wt-%, about 0.5 to about 10 wt-%, about 0.8 to about 8 wt-%, about 1 wt-% to about 6 wt-%, or about 2 wt-% to about 4 wt-%. It is to be understood that all values and ranges between these values and ranges are encompassed by the compositions of the present invention.

Processing Aid

In some embodiments, the compositions of the present invention further comprise a processing aid. Processing aids are materials which enhance the production process for the cleaning composition. They can serve as drying agents, modify the rate of solidification, alter the transfer of water of hydration in the formula, or even act as the solidifying matrix itself. Processing aids can have some overlap with other functionalities in the formula. Non limiting examples include silica, alkali metal silicates, urea, polyethylene glycols, solid surfactants, sodium carbonate, potassium chloride, sodium sulfate, sodium hydroxide, water, etc. Which processing aid(s) is suitable is dependent on, for example, the manufacturing procedure and specific cleaning composition.

The processing aid can be present at amounts of about 1 to about 70 wt-%, about 2 to about 50 wt-%, about 3 to about 30 wt-%, about 0.01 to about 60 wt-%, about 0.1 to about 30 wt-%, about 0.2 to about 15 wt-%, about 0.5 to about 10 wt-%, about 0.8 to about 8 wt-%, about 1 wt-% to about 6 wt-%, or about 2 wt-% to about 4 wt-%.

Additional Ingredients

In some embodiments, the compositions of the present invention further comprise an additional ingredient. Additional ingredients suitable for use with the compositions of the present invention include, but are not limited to, detersive polymers, rinse aid compositions, softeners, source of acidity, anti-corrosion agent, detergent filler, defoamer, anti-redeposition agent, antimicrobial, aesthetic enhancing agent, e.g., dye, odorant, perfume, optical brightener, lubricant composition, bleaching agent, enzyme, effervescent agent, activator for the source of alkalinity, calcium salt, and/or other such additives or functional ingredients.

The additional ingredient or ingredients will vary according to the type of composition being manufacture, and the intended end use of the composition. In some embodiments, the composition includes as an additive one or more of cleaning enzyme, detersive polymer, antimicrobial, activators for the source of alkalinity, or mixtures thereof.

Active Oxygen Compounds

The active oxygen compound acts to provide a source of active oxygen, but can also act to form at least a portion of the solidification agent. The active oxygen compound can be inorganic or organic, and can be a mixture thereof. Some examples of active oxygen compound include peroxygen compounds, and peroxygen compound adducts that are suitable for use in forming the binding agent.

Many active oxygen compounds are peroxygen compounds. Any peroxygen compound generally known and that can function, for example, as part of the binding agent can be used. Examples of suitable peroxygen compounds include inorganic and organic peroxygen compounds, or mixtures thereof.

The active oxygen compound can be in the present solid composition at amounts of about 0.1 to about 70 wt-%, about 1 to about 50 wt-%, or about 10 wt-% to about 30 wt-%.

Inorganic Active Oxygen Compound

Examples of inorganic active oxygen compounds include the following types of compounds or sources of these compounds, or alkali metal salts including these types of compounds, or forming an adduct therewith: hydrogen peroxide; group 1 (IA) active oxygen compounds, for example lithium peroxide, sodium peroxide, and the like; group 2 (IIA) active oxygen compounds, for example magnesium peroxide, calcium peroxide, strontium peroxide, barium peroxide, and the like; group 12 (IIB) active oxygen compounds, for example zinc peroxide, and the like; group 13 (IIIA) active oxygen compounds, for example boron compounds, such as perborates, for example sodium perborate hexahydrate of the formula $Na_2[Br_2(O_2)_2(OH)_4] \cdot 6H_2O$ (also called sodium perborate tetrahydrate and formerly written as $NaBO_3 \cdot 4H_2O$); sodium peroxyborate tetrahydrate of the formula $Na_2Br_2(O_2)_2[(OH)_4] \cdot 4H_2O$ (also called sodium perborate trihydrate, and formerly written as $NaBO_3 \cdot 3H_2O$); sodium peroxyborate of the formula $Na_2[B_2(O_2)_2(OH)_4]$ (also called sodium perborate monohydrate and formerly written as $NaBO_3 \cdot H_2O$); and the like; e.g., perborate; group 14 (IVA) active oxygen compounds, for example persilicates and peroxycarbonates, which are also called percarbonates, such as persilicates or peroxycarbonates of alkali metals; and the like; e.g., percarbonate, e.g., persilicate;

group 15 (VA) active oxygen compounds, for example peroxynitrous acid and its salts; peroxyphosphoric acids and their salts, for example, perphosphates; and the like; e.g., perphosphate; group 16 (VIA) active oxygen compounds, for example peroxysulfuric acids and their salts, such as peroxymonosulfuric and peroxydisulfuric acids, and their salts, such as persulfates, for example, sodium persulfate; and the like; e.g., persulfate; group VIIa active oxygen compounds such as sodium periodate, potassium perchlorate and the like.

Other active inorganic oxygen compounds can include transition metal peroxides; and other such peroxygen compounds, and mixtures thereof.

In certain embodiments, the compositions and methods of the present invention employ certain of the inorganic active oxygen compounds listed above. Suitable inorganic active oxygen compounds include hydrogen peroxide, hydrogen peroxide adduct, group IIIA active oxygen compounds, group VIA active oxygen compound, group VA active oxygen compound, group VIIA active oxygen compound, or mixtures thereof. Examples of such inorganic active oxygen compounds include percarbonate, perborate, persulfate, perphosphate, persilicate, or mixtures thereof. Hydrogen peroxide presents an example of an inorganic active oxygen compound. Hydrogen peroxide can be formulated as a mixture of hydrogen peroxide and water, e.g., as liquid hydrogen peroxide in an aqueous solution. The mixture of solution can include about 5 to about 40 wt-% hydrogen peroxide or 5 to 50 wt-% hydrogen peroxide.

In an embodiment, the inorganic active oxygen compounds include hydrogen peroxide adduct. For example, the inorganic active oxygen compounds can include hydrogen peroxide, hydrogen peroxide adduct, or mixtures thereof. Any of a variety of hydrogen peroxide adducts are suitable for use in the present compositions and methods. For example, suitable hydrogen peroxide adducts include percarbonate salt, urea peroxide, peracetyl borate, an adduct of $H_2O_2$ and polyvinyl pyrrolidone, sodium percarbonate, potassium percarbonate, mixtures thereof, or the like. Suitable hydrogen peroxide adducts include percarbonate salt, urea peroxide, peracetyl borate, an adduct of $H_2O_2$ and polyvinyl pyrrolidone, or mixtures thereof. Suitable hydrogen peroxide adducts include sodium percarbonate, potassium percarbonate, or mixtures thereof, e.g., sodium percarbonate.

Organic Active Oxygen Compound

Any of a variety of organic active oxygen compounds can be employed in the compositions and methods of the present invention. For example, the organic active oxygen compound can be a peroxycarboxylic acid, such as a mono- or di-peroxycarboxylic acid, an alkali metal salt including these types of compounds, or an adduct of such a compound. Suitable peroxycarboxylic acids include $C_1$-$C_{24}$ peroxycarboxylic acid, salt of $C_1$-$C_{24}$ peroxycarboxylic acid, ester of $C_1$-$C_{24}$ peroxycarboxylic acid, diperoxycarboxylic acid, salt of diperoxycarboxylic acid, ester of diperoxycarboxylic acid, or mixtures thereof.

Suitable peroxycarboxylic acids include $C_1$-$C_{10}$ aliphatic peroxycarboxylic acid, salt of $C_1$-$C_{10}$ aliphatic peroxycarboxylic acid, ester of $C_1$-$C_{10}$ aliphatic peroxycarboxylic acid, or mixtures thereof; e.g., salt of or adduct of peroxyacetic acid; e.g., peroxyacetyl borate. Suitable diperoxycarboxylic acids include $C_4$-$C_{10}$ aliphatic diperoxycarboxylic acid, salt of $C_4$-$C_{10}$ aliphatic diperoxycarboxylic acid, or ester of $C_4$-$C_{10}$ aliphatic diperoxycarboxylic acid, or mixtures thereof; e.g., a sodium salt of perglutaric acid, of persuccinic acid, of peradipic acid, or mixtures thereof.

Organic active oxygen compounds include other acids including an organic moiety. Suitable organic active oxygen compounds include perphosphonic acids, perphosphonic acid salts, perphosphonic acid esters, or mixtures or combinations thereof.

Active Oxygen Compound Adducts

Active oxygen compound adducts include any generally known and that can function, for example, as a source of active oxygen and as part of the solidified composition. Hydrogen peroxide adducts, or peroxyhydrates, are suitable. Some examples of source of alkalinity adducts include the following: alkali metal percarbonates, for example sodium percarbonate (sodium carbonate peroxyhydrate), potassium percarbonate, rubidium percarbonate, cesium percarbonate, and the like; ammonium carbonate peroxyhydrate, and the like; urea peroxyhydrate, peroxyacetyl borate; an adduct of $H_2O_2$ polyvinyl pyrrolidone, and the like, and mixtures of any of the above.

Glass and Metal Corrosion Inhibitors

The solid cleaning composition can include a metal corrosion inhibitor in an amount up to about 50 wt-%, about 1 to about 40 wt-%, or about 3 to about 30 wt-%. The corrosion inhibitor is included in the solid detergent composition in an amount sufficient to provide a use solution that exhibits a rate of corrosion and/or etching of glass that is less than the rate of corrosion and/or etching of glass for an otherwise identical use solution except for the absence of the corrosion inhibitor. It is expected that the use solution will include at least about 6 parts per million (ppm) of the corrosion inhibitor to provide desired corrosion inhibition properties. It is expected that larger amounts of corrosion inhibitor can be used in the use solution without deleterious effects. It is expected that at a certain point, the additive effect of increased corrosion and/or etching resistance with increasing corrosion inhibitor concentration will be lost, and additional corrosion inhibitor will simply increase the cost of using the solid detergent composition.

The use solution can include about 6 ppm to about 300 ppm of the corrosion inhibitor or about 20 ppm to about 200 ppm of the corrosion inhibitor when used to inhibit the corrosion of glass. When used to inhibit the corrosion of metals, e.g., aluminum, the use solution can include about 10 to about 2000 ppm, about 100 to about 1500 ppm, or about 500 to about 1200 ppm of the corrosion inhibitor. Examples of suitable corrosion inhibitors include, but are not limited to: a combination of a source of aluminum ion and a source of zinc ion, as well as an alkaline metal silicate or hydrate thereof.

The corrosion inhibitor can refer to the combination of a source of aluminum ion and a source of zinc ion. The source of aluminum ion and the source of zinc ion provide aluminum ion and zinc ion, respectively, when the solid detergent composition is provided in the form of a use solution. The amount of the corrosion inhibitor is calculated based upon the combined amount of the source of aluminum ion and the source of zinc ion. Anything that provides an aluminum ion in a use solution can be referred to as a source of aluminum ion, and anything that provides a zinc ion when provided in a use solution can be referred to as a source of zinc ion. It is not necessary for the source of aluminum ion and/or the source of zinc ion to react to form the aluminum ion and/or the zinc ion. Aluminum ions can be considered a source of aluminum ion, and zinc ions can be considered a source of zinc ion. The source of aluminum ion and the source of zinc ion can be provided as organic salts, inorganic salts, and mixtures thereof.

Suitable sources of aluminum ion include, but are not limited to: aluminum salts such as sodium aluminate, aluminum bromide, aluminum chlorate, aluminum chloride, aluminum iodide, aluminum nitrate, aluminum sulfate, aluminum acetate, aluminum formate, aluminum tartrate, aluminum lactate, aluminum oleate, aluminum bromate, aluminum borate, aluminum potassium sulfate, aluminum zinc sulfate, and aluminum phosphate.

Suitable sources of zinc ion include, but are not limited to: zinc salts such as zinc chloride, zinc sulfate, zinc nitrate, zinc iodide, zinc thiocyanate, zinc fluorosilicate, zinc dichromate, zinc chlorate, sodium zincate, zinc gluconate, zinc acetate, zinc benzoate, zinc citrate, zinc lactate, zinc formate, zinc bromate, zinc bromide, zinc fluoride, zinc fluorosilicate, and zinc salicylate.

By controlling the ratio of the aluminum ion to the zinc ion in the use solution, it is possible to provide reduced corrosion and/or etching of glassware and ceramics compared with the use of either component alone. That is, the combination of the aluminum ion and the zinc ion can provide a synergy in the reduction of corrosion and/or etching. The ratio of the source of aluminum ion to the source of zinc ion can be controlled to provide a synergistic effect. In general, the weight ratio of aluminum ion to zinc ion in the use solution can be at least about 6:1, can be less than about 1:20, and can be about 2:1 and about 1:15.

An effective amount of an alkaline metal silicate or hydrate thereof can be employed in the compositions and processes of the invention to form a stable solid detergent composition having metal protecting capacity. The silicates employed in the compositions of the invention are those that have conventionally been used in solid detergent formulations. For example, typical alkali metal silicates are those powdered, particulate or granular silicates which are either anhydrous or, for example, which contain water of hydration (about 5% to about 25 wt-%, about 15% to about 20 wt-% water of hydration). These silicates are can be sodium silicates and have a $Na_2O$:$SiO_2$ ratio of about 1:1 to about 1:5, respectively, and typically contain available water in the amount of from about 5% to about 25 wt-%. In general, the silicates have a $Na_2O$:$SiO_2$ ratio of about 1:1 to about 1:3.75, about 1:1.5 to about 1:3.75 and most about 1:1.5 to about 1:2.5. A silicate with a $Na_2O$:$SiO_2$ ratio of about 1:2 and about 16% to about 22 wt-% water of hydration, is suitable. For example, such silicates are available in powder form as GD Silicate and in granular form as Britesil H-20, available from PQ Corporation, Valley Forge, Pa. These ratios may be obtained with single silicate compositions or combinations of silicates which upon combination result in the suitable ratio. The hydrated silicates at suitable ratios, a $Na_2O$:$SiO_2$ ratio of about 1:1.5 to about 1:2.5, have been found to provide the optimum metal protection and rapidly form a solid detergent. Hydrated silicates are suitable.

Silicates can be included in the solid detergent composition to provide for metal protection but are additionally known to provide alkalinity and additionally function as anti-redeposition agents. Suitable silicates include, but are not limited to: sodium silicate and potassium silicate. The solid detergent composition can be provided without silicates, but when silicates are included, they can be included in amounts that provide for desired metal protection. The composition can include silicates in amounts of at least about 1 wt-%, at least about 5 wt-%, at least about 10 wt-%, and at least about 15 wt-%. In addition, in order to provide sufficient room for other components in the composition, the silicate component can be provided at a level of less than about 20 wt-%, less than about 25 wt-%, less than about 20 wt-%, or less than about 15 wt-%.

Antimicrobials

Antimicrobial agents are chemical compositions that when used in a solid functional material alone, or in combination with other components, act to reduce or prevent microbial contamination and deterioration of commercial products, material systems, surfaces, etc. In some aspects, these materials fall in specific classes including phenolics, halogen compounds, quaternary ammonium compounds, metal derivatives, amines, alkanol amines, nitro derivatives, analides, organosulfur and sulfur-nitrogen compounds and miscellaneous compounds.

It should also be understood that the source of alkalinity used in the formation of compositions embodying the invention also act as antimicrobial agents, and can even provide sanitizing activity. In fact, in some embodiments, the ability of the source of alkalinity to act as an antimicrobial agent reduces the need for secondary antimicrobial agents within the composition. For example, percarbonate compositions have been demonstrated to provide excellent antimicrobial action. Nonetheless, some embodiments incorporate additional antimicrobial agents.

The given antimicrobial agent, depending on chemical composition and concentration, may simply limit further proliferation of numbers of the microbe or may destroy all or a portion of the microbial population. The terms "microbes" and "microorganisms" typically refer primarily to bacteria, virus, yeast, spores, and fungus microorganisms. In use, the antimicrobial agents are typically formed into a solid functional material that when diluted and dispensed, optionally, for example, using an aqueous stream forms an aqueous disinfectant or sanitizer composition that can be contacted with a variety of surfaces resulting in prevention of growth or the killing of a portion of the microbial population. A three log reduction of the microbial population results in a sanitizer composition. The antimicrobial agent can be encapsulated, for example, to improve its stability.

Common antimicrobial agents include phenolic antimicrobials such as pentachlorophenol, orthophenylphenol, a chloro-p-benzylphenol, p-chloro-m-xylenol. Halogen containing antibacterial agents include sodium trichloroisocyanurate, sodium dichloro isocyanate (anhydrous or dihydrate), iodine-poly(vinylpyrrolidinone) complexes, bromine compounds such as 2-bromo-2-nitropropane-1,3-diol, and quaternary antimicrobial agents such as benzalkonium chloride, didecyldimethyl ammonium chloride, choline diiodochloride, tetramethyl phosphonium tribromide. Other antimicrobial compositions such as hexahydro-1,3,5-tris(2-hydroxyethyl)-s-triazine, dithiocarbamates such as sodium dimethyldithiocarbamate, and a variety of other materials are known in the art for their antimicrobial properties. In some embodiments, an antimicrobial component, such as TAED can be included in the range of about 0.001 to about 75 wt-% of the composition, about 0.01 to about 20 wt-%, or about 0.05 to about 10 wt-%.

If present in compositions, the additional antimicrobial agent can be about 0.01 to about 30 wt-% of the composition, about 0.05 to about 10 wt-%, or about 0.1 to about 5 wt-%. In a use solution the additional antimicrobial agent can be about 0.001 to about 5 wt-% of the composition, about 0.01 to about 2 wt-%), or about 0.05 to about 0.5 wt-%.

Activators

In some embodiments, the antimicrobial activity or bleaching activity of the composition can be enhanced by the addition of a material which, when the composition is placed in use, reacts with the active oxygen to form an activated component. For example, in some embodiments, a peracid or a peracid salt is formed. For example, in some embodiments, tetraacetylethylene diamine can be included within the composition to react with the active oxygen and form a peracid or a peracid salt that acts as an antimicrobial agent. Other examples of active oxygen activators include transition metals and their compounds, compounds that contain a carboxylic, nitrile, or ester moiety, or other such compounds known in the art. In an embodiment, the activator includes tetraacetylethylene diamine; transition metal; compound that includes carboxylic, nitrile, amine, or ester moiety; or mixtures thereof.

In some embodiments, an activator component can include in the range of 0.001 to 75 wt-%, about 0.01 to about 20 wt-%, or about 0.05 to about 10 wt-% of the composition. In an embodiment, the activator for the source of alkalinity combines with the active oxygen to form an antimicrobial agent. The solid composition typically remains stable even in the presence of activator of the source of alkalinity. In many compositions it would be expected to react with and destabilize or change the form of the source of alkalinity. In contrast, in an embodiment of the present invention, the composition remains solid; it does not swell, crack, or enlarge as it would if the source of alkalinity were reacting with the activator.

In an embodiment, the composition includes a solid block, and an activator material for the active oxygen is coupled to the solid block. The activator can be coupled to the solid block by any of a variety of methods for coupling one solid cleaning composition to another. For example, the activator can be in the form of a solid that is bound, affixed, glued or otherwise adhered to the solid block. Alternatively, the solid activator can be formed around and encasing the block. By way of further example, the solid activator can be coupled to the solid block by the container or package for the cleaning composition, such as by a plastic or shrink wrap or film.

Rinse Aid Functional Materials

Functional materials of the invention can include a formulated rinse aid composition containing a wetting or sheeting agent combined with other optional ingredients in a solid made using the complex of the invention. The rinse aid component for use with the compositions of the present invention can include a water soluble or dispersible low foaming organic material capable of reducing the surface tension of the rinse water to promote sheeting action and to prevent spotting or streaking caused by beaded water after rinsing is completed. This is often used in warewashing processes. Such sheeting agents are typically organic surfactant-like materials having a characteristic cloud point. The cloud point of the surfactant rinse or sheeting agent is defined as the temperature at which a 1 wt-% aqueous solution of the surfactant turns cloudy when warmed.

There are two general types of rinse cycles in commercial warewashing machines, a first type generally considered a sanitizing rinse cycle uses rinse water at a temperature of about 180° F., about 80° C. or higher. A second type of non-sanitizing machines uses a lower temperature non-sanitizing rinse, typically at a temperature of about 125° F., about 50° C. or higher. Surfactants useful in these applications are aqueous rinses having a cloud point greater than the available hot service water. Accordingly, the lowest useful cloud point measured for the surfactants of the invention is approximately 40° C. The cloud point can also be 60° C. or higher, 70° C. or higher, 80° C. or higher, etc., depending on the use locus hot water temperature and the temperature and type of rinse cycle.

Suitable sheeting agents, typically include a polyether compound prepared from ethylene oxide, propylene oxide, or a mixture in a homopolymer or block or heteric copolymer structure. Such polyether compounds are known as polyalkylene oxide polymers, polyoxyalkylene polymers or polyalkylene glycol polymers. Such sheeting agents require a region of relative hydrophobicity and a region of relative hydrophilicity to provide surfactant properties to the molecule. Such sheeting agents have a molecular weight in the range of about 500 to 15,000. Certain types of (PO)(EO) polymeric rinse aids have been found to be useful containing at least one block of poly(PO) and at least one block of poly(EO) in the polymer molecule. Additional blocks of poly(EO), poly PO or random polymerized regions can be formed in the molecule.

Particularly useful polyoxypropylene polyoxyethylene block copolymers are those including a center block of polyoxypropylene units and blocks of polyoxyethylene units to each side of the center block. Such polymers have the formula shown below:

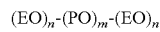

wherein n is an integer of 20 to 60, each end is independently an integer of 10 to 130. Another useful block copolymer are block copolymers having a center block of polyoxyethylene units and blocks of polyoxypropylene to each side of the center block. Such copolymers have the formula:

wherein m is an integer of 15 to 175 and each end are independently integers of about 10 to 30. The solid functional materials of the invention can often use a hydrotrope to aid in maintaining the solubility of sheeting or wetting agents. Hydrotropes can be used to modify the aqueous solution creating increased solubility for the organic material. Suitable hydrotropes are low molecular weight aromatic sulfonate materials such as xylene sulfonates and dialkyldiphenyl oxide sulfonate materials.

In an embodiment, compositions according to the present invention provide desirable rinsing properties in ware washing without employing a separate rinse agent in the rinse cycle. For example, good rinsing occurs using such compositions in the wash cycle when rinsing employs just soft water.

The rinse aid functional material can be in the present solid composition at amounts of about 0.1 to about 15 wt-%, about 1 to about 10 wt-%, or about 2 wt-% to about 8 wt-%.

Additional Bleaching Agents

Additional bleaching agents for use in inventive formulations for lightening or whitening a substrate, include bleaching compounds capable of liberating an active halogen species, such as $Cl_2$, $Br_2$, $I_2$, $ClO_2$, $BrO_2$, $IO_2$, $—OCl^-$, $—OBr^-$ and/or, $—OI^-$, under conditions typically encountered during the cleansing process. Suitable bleaching agents for use in the present cleaning compositions include, for example, chlorine-containing compounds such as a chlorite, a hypochlorite, chloramine. Suitable halogen-releasing compounds include the alkali metal dichloroisocyanurates, chlorinated trisodium phosphate, the alkali metal hypochlorites, alkali metal chlorites, monochloramine and dichloramine, and the like, and mixtures thereof. Encapsulated chlorine sources may also be used to enhance the stability of the chlorine source in the composition (see, for example, U.S. Pat. Nos. 4,618,914 and 4,830,773, the disclosure of which is incorporated by reference herein). A bleaching agent may also be an additional peroxygen or active oxygen source such as hydrogen peroxide, perborates, for example sodium perborate mono and tetrahydrate, sodium carbonate peroxyhydrate, phosphate peroxyhydrates, and potassium permonosulfate, with and without activators such as tetraacetylethylene diamine, and the like, as discussed above.

A cleaning composition may include a minor but effective additional amount of a bleaching agent above that already available from the stabilized source of alkalinity, e.g., about 0.1 to about 10 wt-% or about 1 to about 6 wt-%. The present solid compositions can include bleaching agent in an amount of about 0.1 to about 60 wt-%, about 1 to about 20 wt-%, about 3 to about 8 wt-%, or about 3 to about 6 wt-%.

Hardening Agents

The cleaning compositions may also include a hardening agent in addition to, or in the form of, the builder. A hardening agent is a compound or system of compounds, organic or inorganic, which significantly contributes to the uniform solidification of the composition. The hardening agents should be compatible with the cleaning agent and other active ingredients of the composition and should be capable of providing an effective amount of hardness and/or aqueous solubility to the processed detergent composition. The hardening agents should also be capable of forming a homogeneous matrix with the cleaning agent and other ingredients when mixed and solidified to provide a uniform dissolution of the cleaning agent from the detergent composition during use.

The amount of hardening agent included in the detergent composition will vary according to factors including, but not limited to: the type of detergent composition being prepared, the ingredients of the detergent composition, the intended use of the detergent composition, the quantity of dispensing solution applied to the detergent composition over time during use, the temperature of the dispensing solution, the hardness of the dispensing solution, the physical size of the detergent composition, the concentration of the other ingredients, and the concentration of the cleaning agent in the composition. The amount of the hardening agent included in the solid detergent composition should be effective to combine with the cleaning agent and other ingredients of the composition to form a homogeneous mixture under continuous mixing conditions and a temperature at or below the melting temperature of the hardening agent.

The hardening agent may also form a matrix with the cleaning agent and other ingredients which will harden to a solid form under ambient temperatures of about 30° C. to about 50° C., particularly about 35° C. to about 45° C., after mixing ceases and the mixture is dispensed from the mixing system, within about 1 minute to about 3 hours, particularly about 2 minutes to about 2 hours, and particularly about 5 minutes to about 1 hour. A minimal amount of heat from an external source may be applied to the mixture to facilitate processing of the mixture. The amount of the hardening agent included in the detergent composition should be effective to provide a desired hardness and desired rate of controlled solubility of the processed composition when placed in an aqueous medium to achieve a desired rate of dispensing the cleaning agent from the solidified composition during use.

The hardening agent may be an organic or an inorganic hardening agent. A particular organic hardening agent is a polyethylene glycol (PEG) compound. The solidification rate of detergent compositions comprising a polyethylene glycol hardening agent will vary, at least in part, according to the amount and the molecular weight of the polyethylene glycol added to the composition. Examples of suitable polyethylene glycols include, but are not limited to: solid polyethylene glycols of the general formula $H(OCH_2CH_2)_nOH$, where n is greater than 15, more particularly about 30 to about 1700. Typically, the polyethylene glycol is a solid in the form of a free-flowing powder or flakes, having a molecular weight of about 1,000 to about 100,000, particularly having a molecular weight of at least about 1,450 to about 20,000, more particularly between about 1,450 to about 8,000. The polyethylene glycol is present at a concentration of from about 1% to about 75% by weight and particularly about 3% to about 15% by weight. Suitable polyethylene glycol compounds include, but are not limited to: PEG 4000, PEG 1450, and PEG 8000 among others, with PEG 4000 and PEG 8000 being most preferred. An example of a commercially available solid polyethylene glycol includes, but is not limited to: CARBOWAX, available from Union Carbide Corporation, Houston, Tex.

Particular inorganic hardening agents are hydratable inorganic salts, including, but not limited to: sulfates, acetates, and bicarbonates. In an exemplary embodiment, the inorganic hardening agents are present at concentrations of up to about 50% by weight, particularly about 5% to about 25% by weight, and more particularly about 5% to about 15% by weight.

Urea particles may also be employed as hardeners in the detergent compositions. The solidification rate of the compositions will vary, at least in part, depending on the amount, particle size, and shape of the urea added to the cleaning composition. For example, a particulate form of urea may be combined with a cleaning agent and other ingredients, as well as a minor but effective amount of water. The amount and particle size of the urea is effective to combine with the cleaning agent and other ingredients to form a homogeneous mixture without the application of heat from an external source to melt the urea and other ingredients to a molten stage. The amount of urea included in the solid detergent composition should be effective to provide a desired hardness and desired rate of solubility of the composition when placed in an aqueous medium to achieve a desired rate of dispensing the cleaning agent from the solidified composition during use. In an exemplary embodiment, the detergent composition includes between about 5% to about 90% by weight urea, particularly between about 8% and about 40% by weight urea, and more particularly between about 10% and about 30% by weight urea.

The urea may be in the form of prilled beads or powder. Prilled urea is generally available from commercial sources as a mixture of particle sizes ranging from about 8-15 U.S. mesh, as for example, from Arcadian Sohio Company, Nitrogen Chemicals Division. A prilled form of urea is milled to reduce the particle size to about 50 U.S. mesh to about 125 U.S. mesh, particularly about 75-100 U.S. mesh, particularly using a wet mill such as a single or twin-screw extruder, a Teledyne mixer, a Ross emulsifier, and the like.

Secondary Hardening Agents/Solubility Modifiers.

The present compositions may include a minor but effective amount of a secondary hardening agent, as for example, an amide such stearic monoethanolamide or lauric diethanolamide, or an alkylamide, and the like; a solid polyethylene glycol, or a solid EO/PO block copolymer, and the like; starches that have been made water-soluble through an acid or alkaline treatment process; various inorganics that impart solidifying properties to a heated composition upon cooling, and the like. Such compounds may also vary the solubility of the composition in an aqueous medium during use such that the cleaning agent and/or other active ingredients may be dispensed from the solid composition over an extended period of time. The composition may include a secondary hardening agent in an amount of about 5 to about 20 wt-% or about 10 to about 15 wt-%.

Detergent Fillers

A cleaning composition may include an effective amount of one or more of a detergent filler which does not perform as a cleaning agent per se, but cooperates with the cleaning agent to enhance the overall processability of the composition. Examples of fillers suitable for use in the present cleaning compositions include sodium sulfate, sodium chloride, starch, sugars, $C_1$-$C_{10}$ alkylene glycols such as propylene glycol, and the like. A filler such as a sugar (e.g. sucrose) can aid dissolution of a solid composition by acting as a disintegrant. A detergent filler can be included in an amount up to about 50 wt-%, of about 1 to about 20 wt-%, about 3 to about 15 wt-%, about 1 to about 30 wt-%, or about 1.5 to about 25 wt-%.

Defoaming Agents

An effective amount of a defoaming agent for reducing the stability of foam may also be included in the present cleaning compositions. The cleaning composition can include about 0.0001-5 wt-% of a defoaming agent, e.g., about 0.01-3 wt-%. The defoaming agent can be provided in an amount of about 0.0001% to about 10 wt-%, about 0.001% to about 5 wt-%, or about 0.01% to about 1.0 wt-%.

Examples of defoaming agents suitable for use in the present compositions include silicone compounds such as silica dispersed in polydimethylsiloxane, EO/PO block copolymers, alcohol alkoxylates, fatty amides, hydrocarbon waxes, fatty acids, fatty esters, fatty alcohols, fatty acid soaps, ethoxylates, mineral oils, polyethylene glycol esters, alkyl phosphate esters such as monostearyl phosphate, and the like. A discussion of defoaming agents may be found, for example, in U.S. Pat. No. 3,048,548 to Martin et al., U.S. Pat. No. 3,334,147 to Brunelle et al., and U.S. Pat. No. 3,442,242 to Rue et al., the disclosures of which are incorporated by reference herein.

Anti-Redeposition Agents

A cleaning composition may also include an anti-redeposition agent capable of facilitating sustained suspension of soils in a cleaning solution and preventing the removed soils from being redeposited onto the substrate being cleaned. Examples of suitable anti-redeposition agents include fatty acid amides, fluorocarbon surfactants, complex phosphate esters, styrene maleic anhydride copolymers, and cellulosic derivatives such as hydroxyethyl cellulose, hydroxypropyl cellulose, and the like. A cleaning composition may include about 0.5 to about 10 wt-%, e.g., about 1 to about 5 wt-%, of an anti-redeposition agent.

Optical Brighteners

Optical brightener is also referred to as fluorescent whitening agents or fluorescent brightening agents provide optical compensation for the yellow cast in fabric substrates. With optical brighteners yellowing is replaced by light emitted from optical brighteners present in the area commensurate in scope with yellow color. The violet to blue light supplied by the optical brighteners combines with other light reflected from the location to provide a substantially complete or enhanced bright white appearance. This additional light is produced by the brightener through fluorescence. Optical brighteners absorb light in the ultraviolet range 275 through 400 nm and emit light in the ultraviolet blue spectrum 400-500 nm.

Fluorescent compounds belonging to the optical brightener family are typically aromatic or aromatic heterocyclic materials often containing condensed ring system. An important feature of these compounds is the presence of an uninterrupted chain of conjugated double bonds associated with an aromatic ring. The number of such conjugated double bonds is dependent on substituents as well as the planarity of the fluorescent part of the molecule. Most brightener compounds are derivatives of stilbene or 4,4'-diamino stilbene, biphenyl, five membered heterocycles (triazoles, oxazoles, imidazoles, etc.) or six membered heterocycles (cumarins, naphthalamides, triazines, etc.). The choice of optical brighteners for use in detergent compositions will depend upon a number of factors, such as the type of detergent, the nature of other components present in the detergent composition, the temperature of the wash water, the degree of agitation, and the ratio of the material washed to the tub size. The brightener selection is also dependent upon the type of material to be cleaned, e.g., cottons, synthetics, etc. Since most laundry detergent products are used to clean a variety of fabrics, the detergent compositions should contain a mixture of brighteners which are effective for a variety of fabrics. It is of course necessary that the individual components of such a brightener mixture be compatible.

Optical brighteners useful in the present invention are commercially available and will be appreciated by those skilled in the art. Commercial optical brighteners which may be useful in the present invention can be classified into subgroups, which include, but are not necessarily limited to, derivatives of stilbene, pyrazoline, coumarin, carboxylic acid, methinecyanines, dibenzothiophene-5,5-dioxide, azoles, 5- and 6-membered-ring heterocycles and other miscellaneous agents. Examples of these types of brighteners are disclosed in "The Production and Application of Fluorescent Brightening Agents", M. Zahradnik, Published by John Wiley & Sons, New York (1982), the disclosure of which is incorporated herein by reference.

Stilbene derivatives which may be useful in the present invention include, but are not necessarily limited to, derivatives of bis(triazinyl)amino-stilbene; bisacylamino derivatives of stilbene; triazole derivatives of stilbene; oxadiazole derivatives of stilbene; oxazole derivatives of stilbene; and styryl derivatives of stilbene.

For laundry cleaning or sanitizing compositions, suitable optical brighteners include stilbene derivatives, which can be employed at concentrations of up to 5 wt-%.

Stabilizing Agents

The solid detergent composition may also include a stabilizing agent. Examples of suitable stabilizing agents include, but are not limited to: borate, calcium/magnesium ions, propylene glycol, and mixtures thereof. The composition need not include a stabilizing agent, but when the composition includes a stabilizing agent, it can be included in an amount that provides the desired level of stability of the composition. Suitable ranges of the stabilizing agent include up to about 20 wt-%, about 0.5 to about 15 wt-%, or about 2 to about 10 wt-%.

Dispersants

The solid detergent composition may also include a dispersant. Examples of suitable dispersants that can be used in the solid detergent composition include, but are not limited to: maleic acid/olefin copolymers, polyacrylic acid, and mixtures thereof. The composition need not include a dispersant, but when a dispersant is included it can be included in an amount that provides the desired dispersant properties. Suitable ranges of the dispersant in the composition can be up to about 20 wt-%, about 0.5 to about 15 wt-%, or about 2 to about 9 wt-%.

Enzymes

Enzymes that can be included in the solid detergent composition include those enzymes that aid in the removal of starch and/or protein stains. Suitable types of enzymes include, but are not limited to: proteases, alpha-amylases, and mixtures thereof. Suitable proteases that can be used include, but are not limited to: those derived from *Bacillus licheniformix, Bacillus lenus, Bacillus alcalophilus*, and *Bacillus amyloliquefacins*. Suitable alpha-amylases include *Bacillus subtilis, Bacillus amyloliquefaciens*, and *Bacillus licheniformis*. The composition need not include an enzyme, but when the composition includes an enzyme, it can be included in an amount that provides the desired enzymatic activity when the solid detergent composition is provided as a use composition. Suitable ranges of the enzyme in the composition include up to about 15 wt-%, about 0.5 to about 10 wt-%, or about 1 to about 5 wt-%.

Thickeners

The solid detergent compositions can include a rheology modifier or a thickener. The rheology modifier may provide the following functions: increasing the viscosity of the compositions; increasing the particle size of liquid use solutions when dispensed through a spray nozzle; providing the use solutions with vertical cling to surfaces; providing particle suspension within the use solutions; or reducing the evaporation rate of the use solutions.

The rheology modifier may provide a use composition that is pseudo plastic, in other words the use composition or material when left undisturbed (in a shear mode), retains a high viscosity. However, when sheared, the viscosity of the material is substantially but reversibly reduced. After the shear action is removed, the viscosity returns. These properties permit the application of the material through a spray head. When sprayed through a nozzle, the material undergoes shear as it is drawn up a feed tube into a spray head under the influence of pressure and is sheared by the action of a pump in a pump action sprayer. In either case, the viscosity can drop to a point such that substantial quantities of the material can be applied using the spray devices used to apply the material to a soiled surface.

However, once the material comes to rest on a soiled surface, the materials can regain high viscosity to ensure that the material remains in place on the soil. In an embodiment, the material can be applied to a surface resulting in a substantial coating of the material that provides the cleaning components in sufficient concentration to result in lifting and removal of the hardened or baked-on soil. While in contact with the soil on vertical or inclined surfaces, the thickeners in conjunction with the other components of the cleaner minimize dripping, sagging, slumping or other movement of the material under the effects of gravity. The material should be formulated such that the viscosity of the material is adequate to maintain contact substantial quantities of the film of the material with the soil for at least a minute, five minutes or more.

Examples of suitable thickeners or rheology modifiers are polymeric thickeners including, but not limited to: polymers or natural polymers or gums derived from plant or animal sources. Such materials may be polysaccharides such as large polysaccharide molecules having substantial thickening capacity. Thickeners or rheology modifiers also include clays.

A substantially soluble polymeric thickener can be used to provide increased viscosity or increased conductivity to the use compositions. Examples of polymeric thickeners for the aqueous compositions of the invention include, but are not limited to: carboxylated vinyl polymers such as polyacrylic acids and sodium salts thereof, ethoxylated cellulose, polyacrylamide thickeners, cross-linked, xanthan compositions, sodium alginate and algin products, hydroxypropyl cellulose, hydroxyethyl cellulose, and other similar aqueous thickeners that have some substantial proportion of water solubility. Examples of suitable commercially available thickeners include, but are not limited to: Acusol, available from Rohm & Haas Company, Philadelphia, Pa.; and Carbopol, available from B.F. Goodrich, Charlotte, N.C.

Examples of suitable polymeric thickeners include, but not limited to: polysaccharides. An example of a suitable commercially available polysaccharide includes, but is not limited to, Diutan, available from Kelco Division of Merck, San Diego, Calif. Thickeners for use in the solid detergent compositions further include polyvinyl alcohol thickeners, such as, fully hydrolyzed (greater than 98.5 mol acetate replaced with the —OH function).

An example of a suitable polysaccharide includes, but is not limited to, xanthans. Such xanthan polymers are suitable due to their high water solubility, and great thickening power. Xanthan is an extracellular polysaccharide of *Xanthomonas campestras*. Xanthan may be made by fermentation based on corn sugar or other corn sweetener by-products. Xanthan includes a poly beta-(1-4)-D-Glucopyranosyl backbone chain, similar to that found in cellulose. Aqueous dispersions of xanthan gum and its derivatives exhibit novel and remarkable rheological properties. Low concentrations of the gum have relatively high viscosities which permit it to be used economically. Xanthan gum solutions exhibit high pseudo plasticity, i.e. over a wide range of concentrations, rapid shear thinning occurs that is generally understood to be instantaneously reversible. Non-sheared materials have viscosities that appear to be independent of the pH and independent of temperature over wide ranges. Suitable xanthan materials include crosslinked xanthan materials. Xanthan polymers can be crosslinked with a variety of known covalent reacting crosslinking agents reactive with the hydroxyl functionality of large polysaccharide molecules and can also be crosslinked using divalent, trivalent or polyvalent metal ions. Such crosslinked xanthan gels are disclosed in U.S. Pat. No. 4,782, 901, which is herein incorporated by reference. Suitable crosslinking agents for xanthan materials include, but are not limited to: metal cations such as $Al^{+3}$, $Fe^{+3}$, $Sb^{+3}$, $Zr^{+4}$ and other transition metals. Examples of suitable commercially available xanthans include, but are not limited to: KELTROL®, KELZAN® AR, KELZAN® D35, KELZAN® S, KELZAN® XZ, available from Kelco Division of Merck, San Diego, Calif. Known organic crosslinking agents can also be used. A suitable crosslinked xanthan is KELZAN® AR, which provides a pseudo plastic use solution that can produce large particle size mist or aerosol when sprayed.

The thickener can be in the present solid composition at amounts of about 0.1 to about 10 wt-%, about 0.5 to about 8 wt-%, or about 1 wt-% to about 5 wt-%.

Dyes/Odorants

Various dyes, odorants including perfumes, and other aesthetic enhancing agents may also be included in the composition. Dyes may be included to alter the appearance of the composition, as for example, Direct Blue 86 (Miles), Fastusol Blue (Mobay Chemical Corp.), Acid Orange 7 (American Cyanamid), Basic Violet 10 (Sandoz), Acid Yellow 23 (GAF), Acid Yellow 17 (Sigma Chemical), Sap Green (Keyston Analine and Chemical), Metanil Yellow (Keystone Analine and Chemical), Acid Blue 9 (Hilton Davis), Sandolan Blue/Acid Blue 182 (Sandoz), Hisol Fast Red (Capitol Color and Chemical), Fluorescein (Capitol Color and Chemical), Acid Green 25 (Ciba-Geigy), and the like.

Fragrances or perfumes that may be included in the compositions include, for example, terpenoids such as citronellol, aldehydes such as amyl cinnamaldehyde, a jasmine such as C1S-jasmine or jasmal, vanillin, and the like.

The dye or odorant can be in the present solid composition at amounts of about 0.01 to about 10 wt-%, about 0.1 to about 5 wt-%, or about 0.5 wt-% to about 3 wt-%.

The present compositions include concentrate compositions and use compositions. For example, a concentrate composition can be diluted, for example with water, to form a use composition. In an embodiment, a concentrate composition can be diluted to a use solution before to application to an object. For reasons of economics, the concentrate can be marketed and an end user can dilute the concentrate with water or an aqueous diluent to a use solution.

The level of active components in the concentrate composition is dependent on the intended dilution factor and the desired activity of the detergent. In the typical use locus, the concentrate is diluted with a major proportion of water using commonly available tap or service water. A use solution may be prepared from the concentrate by diluting the concentrate with water at a dilution ratio that provides a use solution having desired detersive properties. In an exemplary embodiment, the concentrate may be diluted at a weight ratio of diluent to concentrate of at least about 20:1 or about 20:1 to about 2000:1.

The concentrate may be diluted with water at the location of use to provide the use solution. When the detergent composition is used in an automatic warewashing or dishwashing machine, it is expected that that the location of use will be inside the automatic warewashing machine. For example, when the detergent composition is used in a residential warewashing machine, the composition may be placed in the detergent compartment of the warewashing machine. Depending on the machine, the detergent may be provided in a unit dose form or in a multi-use form. In larger warewashing machines, a large quantity of detergent composition may be provided in a compartment that allows for the release of a single dose amount of the detergent composition for each wash cycle. Such a compartment may be provided as part of the warewashing machine or as a separate structure connected to the warewashing machine. For example, a block of the detergent composition may be provided in a hopper and introduced into the warewashing machine when water is sprayed against the surface of the block to provide a liquid concentrate.

The detergent composition may also be dispensed from a spray-type dispenser. Briefly, a spray-type dispenser functions by impinging a water spray upon an exposed surface of the detergent composition to dissolve a portion of the detergent composition, and then immediately directing the use solution out of the dispenser to a storage reservoir or directly to a point of use. When used, the product may be removed from the packaging (e.g. film) and inserted into the dispenser. The spray of water may be made by a nozzle in a shape that conforms to the shape of the solid detergent composition. The dispenser enclosure may also closely fit the shape of the detergent composition to prevent introducing and dispensing an incorrect detergent composition.

Solid or aggregate compositions and methods embodying the invention are suitable for preparing a variety of solid compositions, as for example, a cast, extruded, molded or formed solid pellet, block, tablet, powder, granule, flake, and the like, or the formed solid or aggregate can thereafter be ground or formed into a powder, granule, flake, and the like. In some embodiments, the solid composition can be formed to have a weight of 50 grams or less, while in other embodiments, the solid composition can be formed to have a weight of 5, 10, 15, 25, or 50 grams or greater, 500 grams or greater, or 1 kilogram or greater. For the purpose of this application the term "solid block" includes cast, formed, or extruded materials having a weight of 50 grams or greater. The solid compositions provide for a stabilized source of functional materials. In some embodiments, the solid composition can be dissolved, for example, in an aqueous or other medium, to create a concentrated and/or use solution. The solution can be directed to a storage reservoir for later use and/or dilution, or can be applied directly to a point of use.

The resulting solid composition can be used in any or a broad variety of applications, depending at least somewhat upon the particular functional materials incorporated into the composition. For example, in some embodiments, the solid composition can provide for a cleaning composition wherein a portion of the solid composition can be dissolved, for example, in an aqueous or other medium, to create a concentrated and/or use cleaning solution. The cleaning solution can be directed to a storage reservoir for later use and/or dilution, or can be applied directly to a point of use.

Solid compositions embodying the invention can be used in a broad variety of cleaning and destaining applications. Some examples include machine and manual warewashing, vehicle cleaning and care applications, presoaks, laundry and textile cleaning and destaining, carpet cleaning and destaining, surface cleaning and destaining, kitchen and bath cleaning and destaining, floor cleaning and destaining, cleaning in place operations, general purpose cleaning and destaining, industrial or household cleaners, pest control agents; or the like, or other applications.

A solid cleaning composition as used in the present disclosure encompasses a variety of forms including, for example, solids, pellets, blocks, and tablets, but not powders. It should be understood that the term "solid" refers to the state of the detergent composition under the expected conditions of storage and use of the solid cleaning composition. In general, it is expected that the detergent composition will remain a solid when provided at a temperature of up to about 100° F. or greater than 120° F.

In certain embodiments, the solid cleaning composition is provided in the form of a unit dose. A unit dose refers to a solid cleaning composition unit sized so that the entire unit is used during a single washing cycle. When the solid cleaning composition is provided as a unit dose, it can have a mass of about 1 g to about 50 g. In other embodiments, the composition can be a solid, a pellet, or a tablet having a size of about 50 g to 250 g, of about 100 g or greater, or about 40 g to about 11,000 g.

In other embodiments, the solid cleaning composition is provided in the form of a multiple-use solid, such as, a block or a plurality of pellets, and can be repeatedly used to generate aqueous detergent compositions for multiple washing cycles. In certain embodiments, the solid cleaning composition is provided as a solid having a mass of about 5 g to 10 kg. In certain embodiments, a multiple-use form of the solid cleaning composition has a mass of about 1 to 10 kg. In further embodiments, a multiple-use form of the solid cleaning composition has a mass of about 5 kg to about 8 kg. In other embodiments, a multiple-use form of the solid cleaning composition has a mass of about 5 g to about 1 kg, or about 5 g and to 500 g.

Packaging System

In some embodiments, the solid composition can be packaged. The packaging receptacle or container may be rigid or flexible, and composed of any material suitable for containing the compositions produced according to the invention, as for example glass, metal, plastic film or sheet, cardboard, cardboard composites, paper, and the like.

Advantageously, since the composition is processed at or near ambient temperatures, the temperature of the processed mixture is low enough so that the mixture may be formed directly in the container or other packaging system without structurally damaging the material. As a result, a wider variety of materials may be used to manufacture the container than those used for compositions that processed and dispensed under molten conditions.

Suitable packaging used to contain the compositions is manufactured from a flexible, easy opening film material.

Dispensing of the Processed Compositions

The cleaning composition made according to the present invention can be dispensed in any suitable method generally known. The cleaning composition can be dispensed from a spray-type dispenser such as that disclosed in U.S. Pat. Nos. 4,826,661, 4,690,305, 4,687,121, 4,426,362 and in U.S. Pat. Nos. Re 32,763 and 32,818, the disclosures of which are incorporated by reference herein. Briefly, a spray-type dispenser functions by impinging a water spray upon an exposed surface of the solid composition to dissolve a portion of the composition, and then immediately directing the concentrate solution including the composition out of the dispenser to a storage reservoir or directly to a point of use. When used, the product is removed from the package (e.g.) film and is inserted into the dispenser. The spray of water can be made by a nozzle in a shape that conforms to the solid shape. The dispenser enclosure can also closely fit the detergent shape in a dispensing system that prevents the introduction and dispensing of an incorrect detergent. The aqueous concentrate is generally directed to a use locus.

In some embodiments, the compositions hereof will be formulated such that during use in aqueous cleaning operations the wash water will have a pH of between about 1 and about 14, about 6.5 to about 11, or 7-10.5. Techniques for controlling pH at recommended usage levels include the use of buffers, alkali, acids, etc., and are well known to those skilled in the art.

In an embodiment, the present composition can be dispensed by immersing either intermittently or continuously in water. The composition can then dissolve, for example, at a controlled or predetermined rate. The rate can be effective to maintain a concentration of dissolved cleaning agent that is effective for cleaning.

In an embodiment, the present composition can be dispensed by scraping solid from the solid composition and contacting the scrapings with water. The scrapings can be added to water to provide a concentration of dissolved cleaning agent that is effective for cleaning.

Methods Employing the Present Compositions

It is contemplated that the cleaning compositions of the invention can be used in a broad variety of industrial, household, health care, vehicle care, and other such applications. Some examples include surface disinfectant, ware cleaning, laundry cleaning, laundry sanitizing, vehicle cleaning, floor cleaning, surface cleaning, pre-soaks, clean in place, and a broad variety of other such applications.

In some embodiments, the present method employs water that wasn't treated with a polymeric water softener bed such as in use today and which requires periodic regeneration with sodium chloride to work.

In some aspects, the present invention provides a method of cleaning an article. The method comprises providing a solid cleaning composition comprising: (i) about 1 to about 50 wt % of a conversion agent comprising a water insoluble compound; and (ii) about 10 to about 95 wt % of an alkalinity source, wherein the conversion agent causes calcium hardness ions in a water source to substantially precipitate in a non-calcite crystalline form. At least a portion of the solid composition is dissolved to create a use solution. The article is then contacted with the use solution such that it is cleaned.

Contacting can include any of numerous methods for applying a composition, such as spraying the composition, immersing the object in the composition, or a combination thereof. The compositions can be applied in a variety of areas including kitchens, bathrooms, factories, hospitals, dental offices and food plants, and can be applied to a variety of hard surfaces having smooth, irregular or porous topography. A use concentration of a composition of the present invention can be applied to or brought into contact with an object by any conventional method or apparatus for applying a cleaning composition to an object. For example, the object can be wiped with, sprayed with, and/or immersed in the composition, or a use solution made from the composition. The composition can be sprayed, or wiped onto a surface; the composition can be caused to flow over the surface, or the surface can be dipped into the composition. Contacting can be manual or by machine.

Exemplary articles that can be treated, i.e., cleaned, with the use solution comprising a detersive composition and treated water include, but are not limited to motor vehicle exteriors, textiles, food contacting articles, clean-in-place (CIP) equipment, health care surfaces and hard surfaces. Exemplary motor vehicle exteriors include cars, trucks, trailers, buses, etc. that are commonly washed in commercial vehicle washing facilities. Exemplary textiles include, but are not limited to, those textiles that generally are considered within the term "laundry" and include clothes, towels, sheets, etc. In addition, textiles include curtains. Exemplary food contacting articles include, but are not limited to, dishes, glasses, eating utensils, bowls, cooking articles, food storage articles, etc. Exemplary CIP equipment includes, but is not limited to, pipes, tanks, heat exchangers, valves, distribution circuits, pumps, etc. Exemplary health care surfaces include, but are not limited to, surfaces of medical or dental devices or instruments. Exemplary hard surfaces include, but are not limited to, floors, counters, glass, walls, etc. Hard surfaces can also include the inside of dish machines, and laundry machines. In general, hard surfaces can include those surfaces commonly referred to in the cleaning industry as environmental surfaces. Such hard surfaces can be made from a variety of materials including, for example, ceramic, metal, glass, wood or hard plastic.

EXAMPLES

The present invention is more particularly described in the following examples that are intended as illustrations only, since numerous modifications and variations within the scope of the present invention will be apparent to those skilled in the art. Unless otherwise noted, all parts, percentages, and ratios reported in the following examples are on a weight basis, and all reagents used in the examples were obtained, or are available, from the chemical suppliers described below, or may be synthesized by conventional techniques.

Example 1

Solid Cleaning Compositions Based on Conversion Agents

Tables 1 and 2 below describe solid cleaning compositions based on conversion agents comprising water insoluble compounds. Table 1 describes solid compositions including a substantial portion of carbonate. Table 2 describes solid compositions without carbonate.

TABLE 1

Carbonate Containing Cleaning Compositions Including Conversion Agents (wt-%)

| Ingredient | A | B | D | E | I | K | L | M | N | O | P | Q | R | W | X | Y | Z |
|---|---|---|---|---|---|---|---|---|---|---|---|---|---|---|---|---|---|
| sodium carbonate | 64 | 72 | 67 | 67 | 68 | 69 | 64 | 60 | 64 | 66 | 46 | 69 | 69 | 61 | 67 | 67 | 67 |
| sodium sulfate | 6.7 | 7.1 | 6.7 | 6.7 | 6.7 | 6.7 | 6.7 | 6.7 | 6.7 | 6.7 | 4.8 | 6.7 | 6.7 | 6.7 | 6.7 | 6.7 | 6.7 |
| potassium chloride | | | | | | | | | | | 5 | | | | | | |
| sodium hydroxide | 5 | | | | | 5 | 5 | 5 | 5 | | | 5 | 5 | 5 | 5 | 5 | 5 |
| magnesium hydroxide slurry, 60% | 20 | 21 | 20 | 20 | | 20 | 20 | | 20 | | 39 | 20 | 20 | 9.9 | 20 | 20 | 20 |

TABLE 1-continued

Carbonate Containing Cleaning Compositions Including Conversion Agents (wt-%)

| Ingredient | A | B | D | E | I | K | L | M | N | O | P | Q | R | W | X | Y | Z |
|---|---|---|---|---|---|---|---|---|---|---|---|---|---|---|---|---|---|
| magnesium oxide nanoparticles | | | | | | | | | | 12 | | | | | | | |
| magnesium chloride hexahydrate | | | | 24 | | | | 24 | | | | | | 13 | | | |
| phosphate ester surfactant | | 0.11 | 0.1 | | 0.1 | | | | | | | | | | | | |
| defoamer | | 0.63 | 0.6 | | 0.6 | | | | | | | | | | | 2 | |
| Pluronic N3 (BASF) | 5 | | | 0.7 | | 5 | 5 | 5 | 2.5 | 2.5 | 5 | | | 5 | 2 | 2 | 2 |
| Acusol 445ND (Rohm & Haas) | | | | | | | | | 2.5 | | | | | | | | |
| Zeolite A | | | | | | | | | | | | | 14 | | | | |
| water | | | 6.4 | 6.4 | | | | | | 7.9 | | | | | | | |

TABLE 2

Solid Cleaning Compositions Including Conversion Agents Without Carbonate (wt-%)

| Ingredient | C | F | G | H | J | S | T | U | V |
|---|---|---|---|---|---|---|---|---|---|
| sodium sulfate | 73 | 72 | | 74 | 73 | | | | |
| potassium chloride | | | 74 | | | | | | |
| sodium hydroxide | | | | | | | | 5 | 5 |
| magnesium oxide, powder | | | | 11 | 12 | | | | |
| magnesium hydroxide slurry, 60% | 20 | 20 | 19 | | | | | | |
| magnesium hydroxide powder | | | | | | | 95 | | 90 |
| magnesium chloride hexahydrate | | | | | | 95 | | 90 | |
| phosphate ester surfactant | 0.1 | | 0.1 | 0.1 | 0.1 | | | | |
| defoamer | 0.6 | | 0.6 | 0.6 | 0.6 | | | | |
| Pluronic N3 (BASF) | | 0.73 | | | | 5 | 5 | 4.8 | 4.8 |
| water | 6.4 | 6.6 | 6.2 | 14 | 14 | | | | |

Pluronic N3 is an EO-PO copolymer commercially available from BASF. Acusol 445ND is a polyacrylate commercially available from Rohm & Haas. Zeolite A is the common name for a water-insoluble, sodium aluminosilicate having a cage-like structure for the exchange of sodium ion within the cage with calcium ions in the surrounding water.

Making a Solid of Formula A

Formula A was compressed at 50 bar for 30 seconds to form a solid stable block which was very hard and resistant to crumbling/breakage. It removed very easily from the compression mold.

Warewashing Using the Present Solids

The present solids were compared in a 10 cycle wash test against a commercial warewash detergent, Ecolab's Solid Power. Solid Power contained sodium tripolyphosphate (STPP) as builder. Both detergents were used at a concentration of 1200 ppm. Evaluation included washing glasses soiled with milk/grease at three water hardness with a water temperature of 160° F.

All of the washed glasses were visually scored for spotting and also for residual soil film with "1" being a perfectly clean glass and "5" totally covered by the spots or residual soil film. The following table summarizes the glass grading scale.

TABLE 3

| Rating | Spots | Film |
|---|---|---|
| 1 | No spots | No film |
| 2 | ¼ glass spotted | Trace/barely perceptible |
| 3 | ½ glass spotted | Slight film |
| 4 | ¾ glass spotted | Moderate film |
| 5 | Whole glass spotted | Heavy film |

The overall performance of composition A was comparable to Solid Power for removal of the milk/grease soil and the formation of spots.

The results are listed on the following tables.

TABLE 4

Formula A

| | Hardness (grains) | | | | | | | |
|---|---|---|---|---|---|---|---|---|
| | 5 | | 10 | | 17 | | Average | |
| | Spot | Film | Spot | Film | Spot | Film | Spot | Film |
| Solid Power | 1.8 | 1.5 | 1.7 | 2.8 | 5 | 1.8 | 2.8 | 2 |
| Formula A | 1.8 | 1.5 | 2.2 | 1.7 | 4.8 | 2.7 | 2.9 | 1.9 |

TABLE 5

Results of Cleaning with The Present Compositions Including Conversion Agents (wt-%)

| | | | A | B | D | E | I | K | L | M | N | O | P | Q | R | W | X | Y | Z |
|---|---|---|---|---|---|---|---|---|---|---|---|---|---|---|---|---|---|---|---|
| 17 grain | Soiled glasses | Spot | | 5.0 | 5.0, 5.0 | 5.0 | 4.8 | 5.0 | 4.8 | 5.0 | 4.8 | 4.9 | 5.0 | | | 5.0 | 5.0 | 5.0 | |
| | | Film | | 2.3 | 1.5, 2.5 | 2.3 | 2.0 | 2.7 | 2.8 | 2.3 | 2.8 | 2.7 | 2.5 | | | 2.2 | 2.2 | 2.3 | |
| | Redeposition glasses | Spot | | 5.0 | 5.0, 5.0 | 5.0 | 5.0 | 5.0 | 5.0 | 5.0 | 5.0 | 5.0 | 5.0 | | | 5.0 | 5.0 | 5.0 | |
| | | Film | | 1.5 | 2.5, 1.8 | 1.5 | 2.0 | 2.2 | 2.3 | 2.2 | 2.2 | 2.2 | 1.9 | | | 2.5 | 2.0 | 2.0 | |
| 10 grain | Soiled glasses | Spot | 3.2 | | | | | | 3.2 | | | | | 2.2 | | | 3.7 | 3.4 | |
| | | Film | 2.3 | | | | | | 2.3 | | | | | 1.7 | | | 2.8 | 2.0 | |
| | Redeposition glasses | Spot | 5.0 | | | | | | 5.0 | | | | | 3.8 | | | 3.4 | 4.0 | |
| | | Film | 1.9 | | | | | | 1.9 | | | | | 1.6 | | | 1.5 | 1.7 | |
| 5 grain | Soiled glasses | Spot | | | 4 | | | | 1.8 | | | | 1.8 | | | | | | |
| | | Film | | | 1.9 | | | | 1.5 | | | | 1.5 | | | | | | |
| | Redeposition glasses | Spot | | | 4.0 | | | | 1.5 | | | | 1.8 | | | | | | |
| | | Film | | | 2.6 | | | | 1.5 | | | | 1.5 | | | | | | |

TABLE 6

Results of Cleaning with The Present Compositions Including Conversion Agents (wt-%)

| | | | C | F | G | H | J | S | T | U | V |
|---|---|---|---|---|---|---|---|---|---|---|---|
| 17 grain | Soiled glasses | Spot | 4.3 | 4.0 | 2.7 | 4.9 | 3.6 | 1.5 | 1.7 | 1.5 | 3.1 |
| | | Film | 4.7 | 4.8 | 4.8 | 2.5 | 4.8 | 5.0 | 5.0 | 5.0 | 5.0 |
| | Redeposition glasses | Spot | 4.8 | 5.0 | 5.0 | 5.0 | 4.7 | 4.2 | 4.8 | 5.0 | 5.0 |
| | | Film | 1.9 | 3.5 | 4.5 | 3.5 | 3.3 | 1.8 | 2.3 | 1.7 | 2.3 |
| 10 grain | Soiled glasses | Spot | | | | | | | | | |
| | | Film | | | | | | | | | |
| | Redeposition glasses | Spot | | | | | | | | | |
| | | Film | | | | | | | | | |
| 5 grain | Soiled glasses | Spot | | | | | | 1.5 | | | |
| | | Film | | | | | | 5 | | | |
| | Redeposition glasses | Spot | | | | | | 3.7 | | | |
| | | Film | | | | | | 1.5 | | | |

Overall, as can be seen in Table 4, compared to a conventional cleaning composition containing a builder, the compositions of the present invention achieved similar cleaning results without a builder present.

Another ten cycle test was run to determine the effectiveness of a known conventional cleaning composition comprising a builder, i.e., Solid Power®, commercially available from Ecolab Inc., when the builder was replaced with a conversion agent, i.e., $Mg(OH)_2$ of the present invention. The results are shown in the table below. The conventional cleaning composition was also used as a control.

TABLE 7

| | Water Hardness (grains) | Type of Test Score | Soiled Glasses for Soil Removal Measurement | Clean Glasses for Soil Redeposit Measurement | Use Solution pH at 1200 ppm |
|---|---|---|---|---|---|
| Solid Power(control), 1200 ppm | 17 | Spots | 4.8 | 5.0 | 12.04 |
| | | Film | 2.9 | 2.0 | |
| 900 ppm Solid Power, 300 ppm $Mg(OH)_2$ | 17 | Spots | 4.8 | 4.8 | 11.08 |
| | | Film | 2.5 | 2.3 | |

As can be seen in this table, the composition comprising a conversion agent instead of a traditional builder achieved equal if not greater results in cleaning than the conventional detergent comprising a builder.

Example 2

Solids Containing Water Insoluble Conversion Agents

This example established that embodiments of the present solid compositions can be made over ranges of amounts of conversion agents, e.g., insoluble magnesium compounds, and source of alkalinity.

To make the present solids, a total of 50 grams of insoluble magnesium compound ($Mg(OH)_2$), source of alkalinity (sodium hydroxide or sodium carbonate), and water were mixed. If the mixture did not contain free liquid after blending it was pressed into a cup. Then, the content of the cup was evaluated for whether it solidified. The content was graded "1" if not solid and "2" if solid.

Tables 8 and 9 show the component compositions and grade for each composition.

TABLE 8

| Composition | $Mg(OH)_2$ (wt %) | NaOH (wt %) | Water (wt %) | Solid Grade |
|---|---|---|---|---|
| 1 | 100 | 0 | 0 | 1 |
| 2 | 75 | 25 | 0 | 1 |
| 3 | 50 | 50 | 0 | 1 |

TABLE 8-continued

| Composition | Mg(OH)$_2$ (wt %) | NaOH (wt %) | Water (wt %) | Solid Grade |
|---|---|---|---|---|
| 4 | 25 | 75 | 0 | 1 |
| 5 | 0 | 100 | 0 | 2 |
| 6 | 0 | 75 | 25 | 1 |
| 7 | 0 | 50 | 50 | 1 |
| 8 | 0 | 25 | 75 | 1 |
| 9 | 0 | 0 | 100 | 1 |
| 10 | 25 | 0 | 75 | 1 |
| 11 | 50 | 0 | 50 | 1 |
| 12 | 75 | 0 | 25 | 1 |
| 13 | 75 | 12.5 | 12.5 | 1 |
| 14 | 12.5 | 75 | 12.5 | 2 |
| 15 | 12.5 | 12.5 | 75 | 1 |
| 16 | 50 | 25 | 25 | 1 |
| 17 | 25 | 50 | 25 | 2 |
| 18 | 25 | 25 | 50 | 1 |
| 19 | 33 | 33 | 34 | 1 |

TABLE 9

| Composition | Mg(OH)$_2$ (wt %) | Sodium Carbonate (wt %) | Water (wt %) | Solid Grade |
|---|---|---|---|---|
| 41 | 100 | 0 | 0 | 1 |
| 42 | 75 | 25 | 0 | 2 |
| 43 | 50 | 50 | 0 | 1 |
| 44 | 25 | 75 | 0 | 1 |
| 45 | 0 | 100 | 0 | 1 |
| 46 | 0 | 75 | 25 | 1 |
| 47 | 0 | 50 | 50 | 1 |
| 48 | 0 | 25 | 75 | 1 |
| 49 | 0 | 0 | 100 | 1 |
| 50 | 25 | 0 | 75 | 1 |
| 51 | 50 | 0 | 50 | 1 |
| 52 | 75 | 0 | 25 | 1 |
| 53 | 75 | 12.5 | 12.5 | 2 |
| 14 | 12.5 | 75 | 12.5 | 1 |
| 55 | 12.5 | 12.5 | 75 | 2 |
| 56 | 50 | 25 | 25 | 1 |
| 57 | 25 | 50 | 25 | 1 |
| 58 | 25 | 25 | 50 | 1 |
| 59 | 33.3 | 33.3 | 33.4 | 1 |

FIGS. 1 and 2 show a ternary graphs illustrating solidification as a function of the concentrations of insoluble magnesium compound, source of alkalinity, and water. The ternary graphs were produced by entering the data from Tables 8 and 9 into an statistical program, Design Expert, version 6.0.11, available from Stat Ease, Minneapolis, Minn. The lighter shaded areas in each of these figures are the areas where the ratio of sodium hydroxide, water, and conversion agent, i.e., magnesium hydroxide, resulted in solidification.

As can be seen from these tables and figures, a conversion agent comprising a water insoluble magnesium compound, source of alkalinity, and water formed solids. For sodium hydroxide as source of alkalinity, a compressible solid was achieved over the component amounts of the range of about 50 to about 99% sodium hydroxide, 0 to about 30% magnesium hydroxide, and about 1 to about 30% water. For sodium carbonate as source of alkalinity, a compressible solid was achieved over the component amounts of the range of about 50 to about 90% sodium carbonate, 0 to about 20% magnesium hydroxide, and about 10 to about 50% water.

Example 3

Effect of Conversion Agents on Surfaces Contacted with Hard Water

This study evaluated the effect of conversion agents on surfaces contacted with hard water.

Solutions of about 1000 ppm of the various compositions were prepared. Smooth ceramic tiles were rinsed with the solutions and wiped dry. The contact angle of deionized water on the surface of the tiles was measured. The tiles were then rinsed under 17 grain water hardness, dried, and the contact angle was re-measured. The results are shown in the table below

TABLE 10

| | Water Contact Angle | | |
|---|---|---|---|
| | before hard water rinse | after hard water rinse | ratio after/before |
| untreated | 37 | 48 | 1.3 |
| *FloMag H ®, Mg(OH)$_2$ | 18 | 16 | 0.9 |
| *FlowMag MHP ®, Mg(OH)$_2$ | 16 | 18 | 1.1 |

*FlowMag is a tradename of a product of Martin Marietta.

It was theorized that a lower ratio of the contact angle of water before and after hard water rinsing of the substrate correlates to improved protection of the substrate from the hard water as it shows less impact of water hardness ions on the surface wetting. As can be seen from this table, the ratio of the contact angle after/before the hard water rinse was about 1 or less for the magnesium hydroxide solutions tested. Based on these results, it was theorized that these solutions would likely protect a surface from hard water scale.

Example 4

Comparison of a Composition of the Present Invention Comprising a Water Insoluble Conversion Agent with an Art Known Composition Comprising a Water Soluble Magnesium Salt This study evaluated the effect on water hardness ions of a composition of the present invention compared to an art known composition comprising a water soluble magnesium salt.

It was theorized that the compositions of the present invention cause hardness ions, e.g., calcium hardness ions, to precipitate in a non-thermodynamically favored form of calcium carbonate, i.e., aragonite, whereas convention compositions comprising water soluble magnesium salts solubilize the calcium hardness ions.

A composition of the present invention (formula 1) was mixed into 17 grain hard water (about 400 ppm total hardness calculated as calcium carbonate) at a concentration of 1200 ppm. Magnesium hydroxide was used as a conversion agent.

| Formula 1 | |
|---|---|
| Ingredient | wt-% |
| Sodium carbonate | 49 |
| Sodium sulfate | 6.7 |

-continued

Formula 1

| Ingredient | wt-% |
|---|---|
| Surfactant | 5 |
| Magnesium hydroxide | 39 |

A solution was made including 1200 ppm of a cleaning composition of Example 5 from U.S. Pat. No. 5,863,877 in the 17 grain hard water. U.S. Pat. No. 5,863,877 indicates a preferred ratio of 2 moles of magnesium ion to 1 mole of calcium ion. This was obtained by including 39 wt-% magnesium chloride in this composition. This increased the magnesium chloride concentration at the expense of sodium carbonate.

Figure 3:
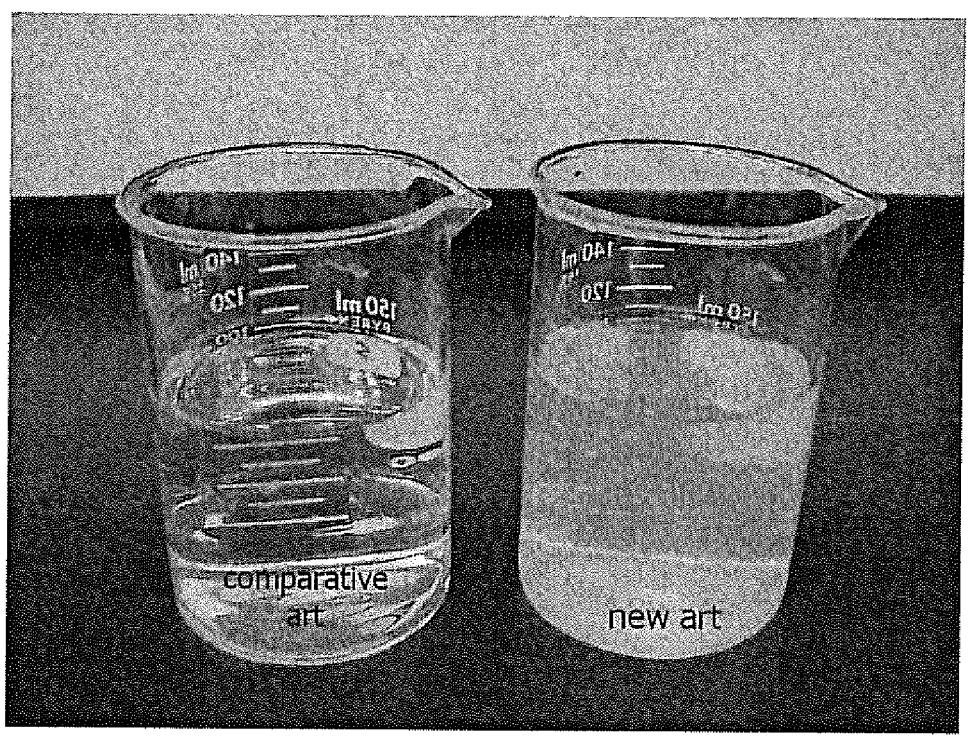
FIG. 3 shows a picture of two aqueous compositions: a comparative art known composition on the left, and a composition of the present invention on the right. The beaker including an embodiment of the present composition is turbid from precipitation of calcium carbonate. The comparative composition yielded a clear solution.

FIG. 3 shows a picture of the two aqueous compositions. The composition comprising a composition of the present invention is shown on the right, and the art known composition is shown on the left. As can be seen from this figure, the inventive composition of Formula 1 is turbid from precipitation of calcium carbonate. The comparative composition yielded a clear solution. U.S. Pat. No. 5,863,877 touts the clarity of the solution as indicative of successful control of water hardness.

Overall, it was found that the composition of the present invention comprising an insoluble magnesium compound as a conversion agent, reduces the deleterious effects of hard water without solubilizing calcium carbonate.

Other Embodiments

It is to be understood that while the invention has been described in conjunction with the detailed description thereof, the foregoing description is intended to illustrate, and not limit the scope of the invention, which is defined by the scope of the appended claims. Other aspects, advantages, and modifications are within the scope of the following claims.

In addition, the contents of all patent publications discussed supra are incorporated in their entirety by this reference.

It is to be understood that wherever values and ranges are provided herein, all values and ranges encompassed by these values and ranges, are meant to be encompassed within the scope of the present invention. Moreover, all values that fall within these ranges, as well as the upper or lower limits of a range of values, are also contemplated by the present application.

We claim:

1. A solid cleaning composition comprising:
    (a) 1 to 50 wt % of a conversion agent comprising a water insoluble compound selected from the group consisting of magnesium oxide, magnesium and titanium hydroxides, and combinations thereof;
    (b) greater than about 20 wt % of an alkalinity source, wherein the conversion agent causes calcium hardness ions in a water source to substantially precipitate in a non-calcite crystalline form;
    (c) about 1 to about 50 wt % of a salt selected from the group consisting of monovalent alkali compounds having halide or sulfate as the anion; and
    (d) 15 to about 50 wt % water; and
    the composition is free of chelating agent, phosphate and water soluble magnesium sources.

2. The composition of claim 1, wherein the non-calcite crystalline form is aragonite.

3. The composition of claim 1, wherein the conversion agent further comprises aragonite.

4. The composition of claim 3, wherein the conversion agent further comprises about 1 to about 50 wt % of aragonite.

5. The composition of claim 1, wherein the alkalinity source is selected from the group consisting of an alkali metal carbonate, an alkali metal hydroxide, and combinations thereof.

6. The composition of claim 5, wherein the alkali metal carbonate is selected from the group consisting of sodium carbonate, potassium carbonate, lithium carbonate, sodium bicarbonate, potassium bicarbonate, lithium bicarbonate, sodium sesquicarbonate, potassium sesquicarbonate, lithium sesquicarbonate, and combinations thereof.

7. The composition of claim 5, wherein the alkali metal hydroxide is selected from the group consisting of sodium hydroxide, lithium hydroxide, potassium hydroxide, and combinations thereof.

8. The composition of claim 1, wherein the water is present in an amount from about 20 to about 50 wt % water.

9. The composition of claim 1, wherein the composition further comprises a surfactant selected from the group consisting of nonionic surfactants, cationic surfactants, anionic surfactants, amphoteric surfactants, and combinations thereof.

10. The composition of claim 9, wherein the surfactant is a nonionic low foaming surfactant.

11. The composition of claim 1, wherein the composition comprises:
    about 5 to about 30 wt % of the conversion agent; and
    about 25 to about 75% of the alkalinity source.

12. The composition of claim 1, wherein the composition comprises;
    about 10 to about 20 wt % of the conversion agent; and
    about 25 to about 65 wt % of the alkalinity source.

13. A method of cleaning an article, the method comprising:
    (a) providing a solid cleaning composition according to claim 1;
    (b) dissolving at least a portion of the solid cleaning composition to create a use solution; and
    (c) contacting the article with the use solution, such that the article is cleaned.

14. The method of claim 13, wherein the conversion agent is magnesium oxide.

15. The method of claim 13, wherein the conversion agent is selected from the group consisting of magnesium hydroxide, titanium hydroxide and combinations thereof.

16. The method of claim 13, wherein the article is selected from the group consisting of a medical device, a laundry article, an article of ware, a hard surface, and combinations thereof.

17. The method of claim 13, wherein the method is used in a presoak application.

18. The method of claim 13, wherein the method is used in a rinse application.

* * * * *